(12) United States Patent
Higuchi et al.

(10) Patent No.: US 8,078,635 B2
(45) Date of Patent: Dec. 13, 2011

(54) INFORMATION PROCESSING APPARATUS, INFORMATION PROCESSING METHOD, AND INFORMATION PROCESSING PROGRAM

(75) Inventors: Yoshinari Higuchi, Tokyo (JP); Masaki Mikamo, Kanagawa (JP)

(73) Assignee: Sony Corporation, Tokyo (JP)

( * ) Notice: Subject to any disclaimer, the term of this patent is extended or adjusted under 35 U.S.C. 154(b) by 619 days.

(21) Appl. No.: 12/173,378

(22) Filed: Jul. 15, 2008

(65) Prior Publication Data

US 2009/0049058 A1    Feb. 19, 2009

(30) Foreign Application Priority Data

Aug. 17, 2007 (JP) ................... 2007-213143

(51) Int. Cl.
*G06F 17/30* (2006.01)
(52) U.S. Cl. ........................ 707/783; 707/763
(58) Field of Classification Search .............. 707/703, 707/758, 783, 736
See application file for complete search history.

(56) References Cited

U.S. PATENT DOCUMENTS

| | | | |
|---|---|---|---|
| 6,271,752 B1 * | 8/2001 | Vaios ......................... 340/541 |
| 2001/0025303 A1 * | 9/2001 | Fisher et al. ................ 709/217 |
| 2001/0045985 A1 * | 11/2001 | Edwards et al. ............ 348/231 |
| 2001/0052911 A1 * | 12/2001 | Boyle et al. ................. 345/763 |
| 2003/0030839 A1 * | 2/2003 | Walters et al. .............. 358/1.15 |
| 2003/0220145 A1 * | 11/2003 | Erickson et al. ............... 463/47 |
| 2004/0002302 A1 * | 1/2004 | Takemoto et al. .......... 455/3.06 |
| 2004/0109063 A1 * | 6/2004 | Kusaka et al. ............. 348/207.1 |
| 2006/0075235 A1 * | 4/2006 | Renkis ......................... 713/171 |
| 2006/0106804 A1 * | 5/2006 | Chande ......................... 707/10 |
| 2006/0259933 A1 * | 11/2006 | Fishel et al. ................. 725/105 |
| 2006/0271695 A1 * | 11/2006 | Lavian ........................ 709/229 |
| 2007/0019077 A1 * | 1/2007 | Park ......................... 348/211.99 |
| 2007/0028277 A1 * | 2/2007 | Clemente et al. ........... 725/105 |
| 2007/0291303 A1 * | 12/2007 | Tanaka et al. ............... 358/1.15 |
| 2008/0299997 A1 * | 12/2008 | Klassen et al. .............. 455/466 |
| 2010/0241658 A1 * | 9/2010 | Rathurs et al. .............. 707/769 |

FOREIGN PATENT DOCUMENTS

| | | |
|---|---|---|
| JP | 63-266562 | 11/1988 |
| JP | 5-128042 | 5/1993 |
| JP | 2003-167742 A | 6/2003 |
| JP | 2005-520247 | 7/2005 |
| WO | WO 2007/066412 A1 | 6/2007 |

* cited by examiner

*Primary Examiner* — James Trujillo
*Assistant Examiner* — Linh Black
(74) *Attorney, Agent, or Firm* — Oblon, Spivak, McClelland, Maier & Neustadt, L.L.P.

(57) ABSTRACT

An information processing apparatus includes a communication connection section that is communicably connected to an external apparatus; a first storage section that stores a predetermined program to be executed by the external apparatus, and for which read/write operation from the external apparatus is inhibited; a second storage section to which read/write operation from the external apparatus is inhibited; and a write section that reads out the predetermined program stored in the first storage section when the information processing apparatus is communicably connected to the external apparatus by the communication connection section and writes the read out program in the second storage section.

8 Claims, 14 Drawing Sheets

1 APPLICATION EXECUTION SYSTEM

3 PERSONAL COMPUTER

2 IMAGING APPARATUS

INFORMATION PROCESSING APPARATUS, INFORMATION PROCESSING METHOD, AND INFORMATION PROCESSING PROGRAM

CROSS REFERENCE TO RELATED APPLICATIONS

The present invention contains subject matter related to Japanese Patent Application JP 2007-213143 filed in the Japanese Patent Office on Aug. 17, 2007, the entire contents of which being incorporated herein by reference.

BACKGROUND OF THE INVENTION

1. Field of the Invention

The present invention relates to an information processing apparatus, an information processing method, and an information processing program and is suitably applied to a digital still camera allowing a personal computer to read out a program stored therein when being communicably connected to the computer.

2. Description of the Related Art

There is known a digital still camera that previously stores, in a storage section thereof, a program to be executed by a personal computer. When the digital still camera is communicably connected to the personal computer, the program stored in the digital still camera is read out by the personal computer.

Such a digital still camera manages the storage area of its storage section by dividing it into an externally inaccessible area for which read/write (access) operation cannot be made from an external apparatus (in this case, personal computer) and externally accessible area for which access operation can be made from a personal computer. The digital still camera stores a basic program for controlling the operation of the digital still camera itself in the externally inaccessible area so as not to allow the personal computer to access the basic program and stores a program to be executed by the personal computer in the externally accessible area so as to allow the personal computer to access the program (refer to, e.g., published Jpn. translation No. 2005/520247 A1 of PCT int. publication).

Therefore, when being communicably connected to such a digital camera, the personal computer reads out the program stored in the externally accessible area of the storage section of the digital still camera. Then, the personal computer displays a selection screen for allowing a user to determine whether to execute or not the program that the personal computer has read out from the storage section of the digital still camera and executes the program when the user determines to execute it.

SUMMARY OF THE INVENTION

The program that has thus been stored in the externally accessible area of the storage section of the digital still camera can be accessed from the personal computer side, so that in the case where the digital still camera is communicably connected to a personal computer infected by a computer virus, the program may illegally be modified by the computer virus.

In such a case, when being communicably connected to the personal computer, a conventional digital still camera allows the personal computer to read out the illegally modified program with the result that the illegally modified program is executed.

The present invention has been made in view of the above point, and achieves an information processing apparatus, an information processing method, and an information processing program capable of allowing an external apparatus communicably connected to the information processing apparatus to reliably read out a proper program.

To solve the above problem, according to an aspect of the present invention, there is provided an information processing apparatus including: a communication connection section that is communicably connected to an external apparatus; a first storage section that stores a predetermined program to be executed by the external apparatus, and for which read/write operation from the external apparatus is inhibited; a second storage section to which read/write operation from the external apparatus is permitted; and a write section that reads out the predetermined program stored in the first storage section when the information processing apparatus is communicably connected to the external apparatus by the communication connection section and writes the read out program in the second storage section.

With the above configuration, even when the program stored in the second storage section has illegally been modified, the information processing apparatus can overwrite the illegally modified program stored in the second storage section with a proper program stored in the first storage section before the external apparatus reads out the program from the second storage section.

As described above, the information processing apparatus according to an aspect of the present invention includes: a communication connection section that is communicably connected to an external apparatus; a first storage section that stores a predetermined program to be executed by the external apparatus, and for which read/write operation from the external apparatus is inhibited; a second storage section to which read/write operation from the external apparatus is permitted; and a write section that reads out the predetermined program stored in the first storage section when the information processing apparatus is communicably connected to the external apparatus by the communication connection section and writes the read out program in the second storage section, so that even when the program stored in the second storage section has illegally been modified, the information processing apparatus can overwrite the illegally modified program stored in the second storage section with a proper program stored in the first storage section before the external apparatus reads out the program from the second storage section, thereby realizing an information processing apparatus, an information processing method, and an information processing program capable of allowing a communicably connected external apparatus to reliably read out a proper program.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Embodiments of the present invention will be described in detail below with reference to the accompanying drawings.

(1) First Embodiment

(1-1) Configuration of Application Execution System

Figure 1:
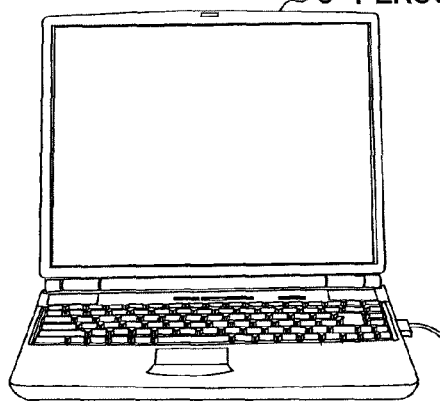
FIG. 1 is a view showing a configuration of an application execution system.
Figure 1:
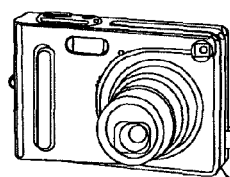

In FIG. 1, reference numeral 1 denotes an application execution system according to the first embodiment. The application execution system 1 includes an imaging apparatus 2 having a function of imaging an object and generating an image file corresponding to the photographed object, as well as having a function of storing an application program that is executed by an external apparatus when being communicably connected to the external apparatus and a personal computer 3 having a function of reading out for executing the application program stored in the imaging apparatus 2 when being communicably connected to the imaging apparatus 2.

Such an application execution system 1 allows the personal computer 3 to read out and execute an application program (hereinafter, referred to as "image browsing application") for allowing a user to browse a list of image files stored in the imaging apparatus 2.

(1-2) Hardware Configuration of Imaging Apparatus

Figure 2:
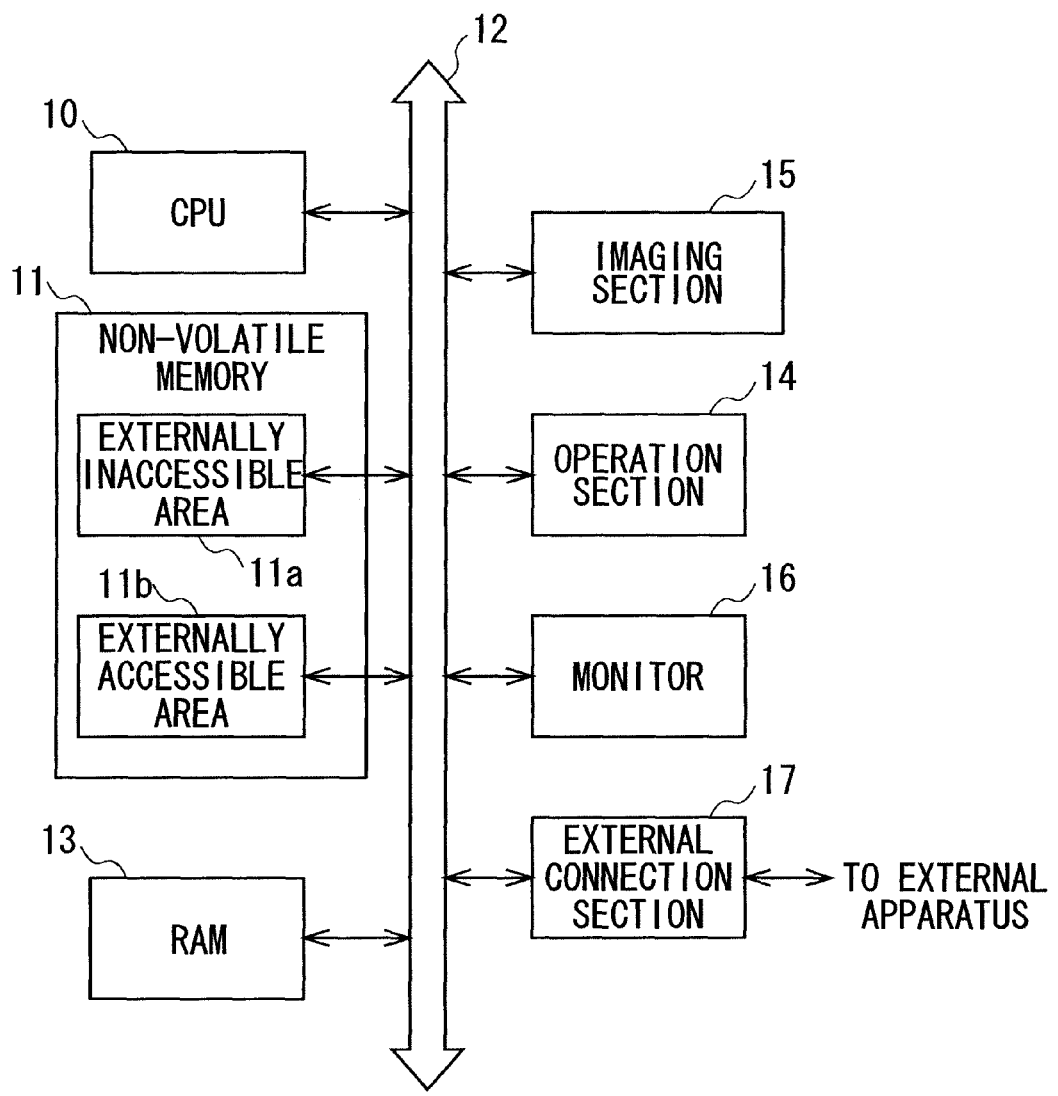
FIG. 2 is a block diagram showing a hardware configuration of an imaging apparatus.

With reference to FIG. 2, a hardware configuration of the imaging apparatus 2 will be described. In the imaging apparatus 2, a central processing unit (CPU) 10 loads various programs such as a basic program previously stored in an externally inaccessible area 11a (to be described later in detail) of a non-volatile memory 11 into a random access memory (RAM) 13 through a bus 12. The CPU 10 then controls the entire operation of the imaging apparatus 2 according to the various programs executed on the RAM 13, as well as performs predetermined calculation processing and controls each component according to a imaging command issued through an operation section 14.

Concretely, when a power of the imaging apparatus 2 is turned on, the CPU 10 of the imaging apparatus 2 allows an imaging section 15 constituted by a lens, an image pickup device, and the like to photograph an object to acquire an image signal corresponding to the photographed object and displays an image based on the image signal on a monitor 16 such as a liquid crystal display (LCD). With the above operation, the imaging apparatus 2 can present the object image photographed by the imaging section 15 to the user.

When being instructed to photograph an object by a user's operation through the operation section 14, the CPU 10 of the imaging apparatus 2 compresses an image signal acquired at that time from the imaging section 15 using a predetermined compression format (e.g., JPEG: Joint Photographic Experts Group) to thereby generate image data. The CPU 10 then generates an image file including the image data.

The CPU 10 of the imaging apparatus 2 stores thus generated image file in, e.g., the non-volatile memory 11.

In this manner, the imaging apparatus 2 generates an image file by imaging an object and stores a plurality of image files therein.

When the CPU 10 of the imaging apparatus 2 is communicably connected to the personal computer 3 through a universal serial bus (USB) cable and an external connection section 17, the image file stored in an externally accessible area 11b of the non-volatile memory 11 is read out by the personal computer 3.

The storage area of the non-volatile memory 11 is divided, under the control of the CPU 10, into the externally inaccessible area 11a for which read/write (i.e., access) operation from an external apparatus (in this case, personal computer 3) is inhibited and externally accessible area 11b to which access operation from the personal computer 3 is permitted.

Concretely, when being communicably connected to the personal computer 3, the CPU 10 of the imaging apparatus 2 provides only a file allocation table (FAT) information (hereinafter, referred to as "storage location management information") that manages the storage location in the externally accessible area 11b of the non-volatile memory 11 to the personal computer 3, to thereby permit the personal computer 3 to access the externally accessible area 11b while inhibit the personal computer 3 from accessing the externally inaccessible area 11a.

In the externally inaccessible area 11a of the imaging apparatus 2, information that one doesn't want an external apparatus (in this case, personal computer 3) to access for illegal modification, such as a basic program required for controlling the operation of the imaging apparatus 2 is previously stored. In the externally accessible area 11b of the imaging apparatus 2, information read out for use by the personal computer 3, such as the plurality of image files acquired as a result of imaging an object is stored.

Figure 3:
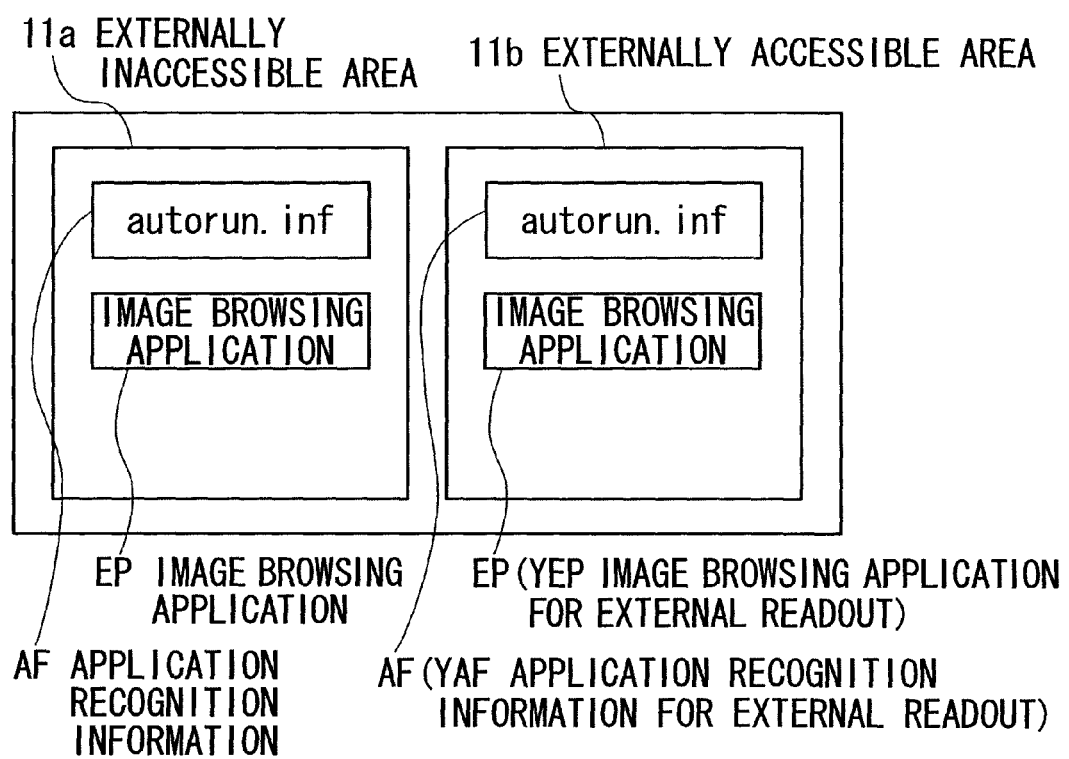
FIG. 3 is a view showing a configuration of a non-volatile memory according to a first embodiment.

Actually, as shown in FIG. 3, in the externally inaccessible area 11a of the imaging apparatus 2, a proper image browsing application EP and a proper application recognition information AF are previously stored. The proper image browsing application EP is used for displaying a list or the plurality of image files stored in the externally accessible area 11b of the imaging apparatus 2 on a monitor of the personal computer 3. The application recognition information AF allows the personal computer 3 to recognize a program (in this case, image browsing application EP) that the personal computer 3 itself reads out (executes). In the externally accessible area 11b of the imaging apparatus 2, copies of the proper image browsing application EP and application recognition information AF stored in the externally inaccessible area 11a are stored so that the personal computer can use them.

As described above, the imaging apparatus 2 stores the proper image browsing application EP to be executed by the personal computer 3 and proper application recognition information AF for allowing the personal computer 3 to recognize the image browsing application EP in the externally inaccessible area 11a of the non-volatile memory 11 and stores the copies of the proper image browsing application EP and application recognition information AF in the externally accessible area 11b so that the personal computer 3 can read out for using them. In the following description, the image browsing application EP and application recognition information AF stored in the externally accessible area 11b of the non-volatile memory 11 are referred to for convenience as "image browsing application YEP for external readout" and "application recognition information YAF for external readout" so as to distinguish them from the proper image browsing application EP and application recognition information AF stored in the externally inaccessible area 11a.

Write instruction information is stored in the externally inaccessible area 11a of the non-volatile memory 11. When the imaging apparatus 2 is communicably connected to an external apparatus (in this case, personal computer 3), the write instruction information instructs reading out of the image browsing application EP and application recognition information AF from the externally inaccessible area 11a and writing of the read out image browsing application EP and application recognition information AF into the externally accessible area 11b.

When the CPU 10 of the imaging apparatus 2 recognizes, through the external connection section 17, that it has been communicably connected to the personal computer 3 through, e.g., a USB cable, the CPU 10 reads out the write instruction information from the externally inaccessible area 11a of the non-volatile memory 11. The CPU 10 of the imaging apparatus 2 then reads out the proper application recognition information AF and image browsing application EP specified by the write instruction information from the externally inaccessible area 11a of the non-volatile memory 11.

After reading out the proper application recognition information AF and image browsing application EP from the externally inaccessible area 11a of the non-volatile memory 11, the CPU 10 of the imaging apparatus 2 writes the read out application recognition information AF and image browsing application EP in the externally accessible area 11b.

Figure 4A:
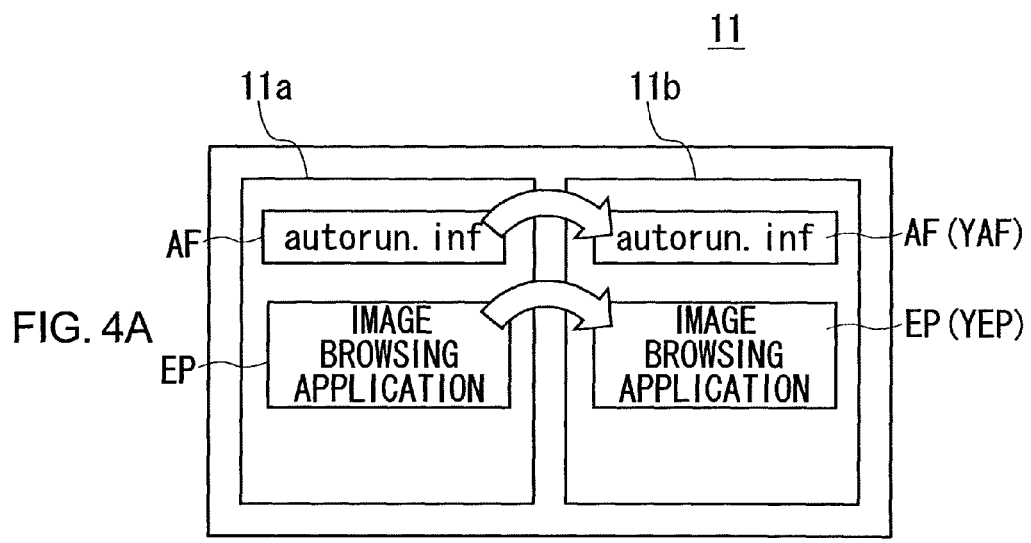
FIGS. 4A and 4B are views to help explain a writing state to an externally accessible area.
Figure 4B:
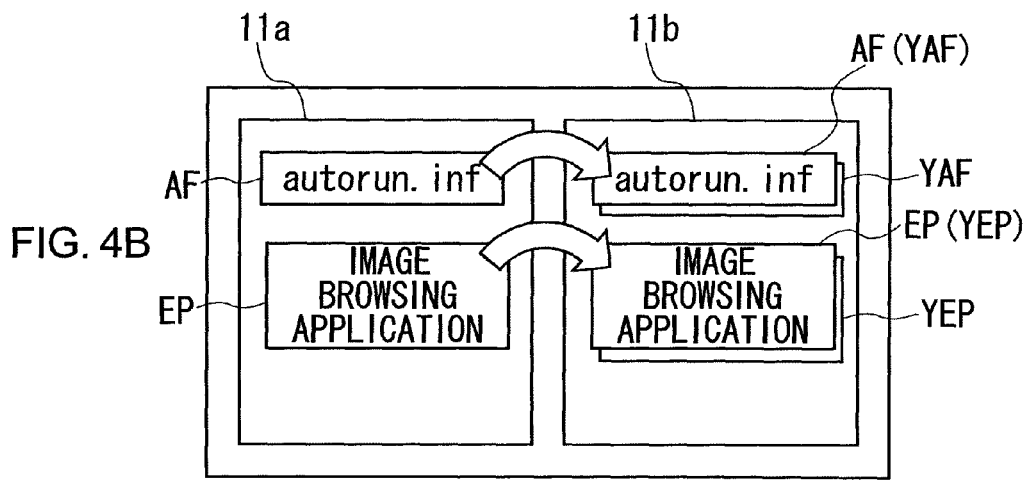

At this time, when the application recognition information YAF for external readout is not stored in the externally accessible area 11b of the non-volatile memory 11, the CPU 10 of the imaging apparatus 2 writes the application recognition information AF read out from the externally inaccessible area 11a in the externally accessible area 11b as the application recognition information YAF for external readout, as shown in FIG. 4A.

Similarly, when the image browsing application YEP for external readout is not stored in the externally accessible area 11b, the CPU 10 of the imaging apparatus 2 writes the image browsing application EP read out from the externally inaccessible area 11a in the externally accessible area 11b as the image browsing application YEP for external readout.

In this manner, even when the application recognition information YAF for external readout or image browsing application YEP for external readout stored in the externally accessible area 11b of the non-volatile memory 11 was erroneously deleted by a user in the previous connection time with the personal computer 3, the imaging apparatus 2 can reliably store the application recognition information YAF for external readout or image browsing application YEP for external readout in the externally accessible area 11b before the personal computer 3 accesses the externally accessible area 11b in the current connection time.

With the above configuration, it is possible to avoid a situation where application recognition information YAF for external readout or image browsing application YEP for external readout is not stored in the externally accessible area 11b when the personal computer 3 accesses the externally accessible area 11b of the non-volatile memory 11, thereby preventing the personal computer 3 from losing the opportunity to read out for using the application recognition information YAF for external readout or image browsing application YEP for external readout.

In the case where the application recognition information YAF for external readout is stored in the externally accessible area 11b when the CPU 10 of the imaging apparatus 2 writes the proper application recognition information AF read out from the externally inaccessible area 11a of the non-volatile memory 11 in the externally accessible area 11b, the CPU 10 overwrites the application recognition information YAF for external readout with the proper application recognition information AF read out from the externally inaccessible area 11a (i.e., writes the application recognition information AF as the application recognition information YAF for external readout to update the application recognition information YAF for external readout stored in the externally accessible area 11b).

Similarly, in the case where the image browsing application YEP for external readout is stored in the externally accessible area 11b when the CPU 10 of the imaging apparatus 2 writes the proper image browsing application EP read out from the externally inaccessible area 11a of the non-volatile memory 11 in the externally accessible area 11b, the CPU 10 overwrites the image browsing application YEP for external readout with the proper image browsing application EP read out from the externally inaccessible area 11a (i.e., writes the image browsing application EP as the image browsing application YEP for external readout to update the image browsing application YEP for external readout stored in the externally accessible area 11b).

In this manner, even when the personal computer 3 to which the imaging apparatus 2 was connected in the previous time has been infected by a computer virus and thereby the application recognition information YAF for external readout or image browsing application YEP for external readout stored in the externally accessible area 11b of the non-volatile memory 11 has illegally been modified by the computer virus, the imaging apparatus 2 can overwrite the illegally modified application recognition information YAF for external readout or image browsing application YEP for external readout with the proper application recognition information AF or image browsing application EP stored in the externally inaccessible area 11a before the personal computer 3 accesses the externally accessible area 11b in the current connection time.

With the above configuration, it is possible to avoid a situation where the application recognition information YAF for external readout or image browsing application YEP for external readout illegally modified by the computer virus is read out when the personal computer 3 accesses the externally accessible area 11b of the non-volatile memory 11, thereby allowing the personal computer 3 to use the proper application recognition information AF or image browsing application EP while reliably preventing the personal computer 3 from using the illegally modified application recognition information YAF for external readout or image browsing application YEP for external readout.

After completion of reading out the application recognition information AF and image browsing application EP from the externally inaccessible area 11a of the non-volatile memory 11 and writing the read out application recognition information AF and image browsing application EP as application recognition information YAF for external readout and image browsing application YEP for external readout in the externally accessible area 11b, the CPU 10 of the imaging apparatus 2 transmits, to the personal computer 3, the storage location management information concerning the externally accessible area 11b of the non-volatile memory 11. As a result, the personal computer can directly access the externally accessible area 11b of the non-volatile memory 11 and control the externally accessible area 11b as one storage section (i.e., mass storage) connected thereto.

As described above, when being communicably connected to the personal computer 3, the imaging apparatus 2 reads out, from the externally inaccessible area 11a, the image browsing application EP to be executed by the personal computer 3 and application recognition information AF indicating a program (in this case, image browsing application EP) to be read out from the imaging apparatus 2 and writes them in the externally accessible area 11b and, after that, handles the control of the externally accessible area 11b to the personal computer 3.

(1-3) Hardware Configuration of Personal Computer

Figure 5:
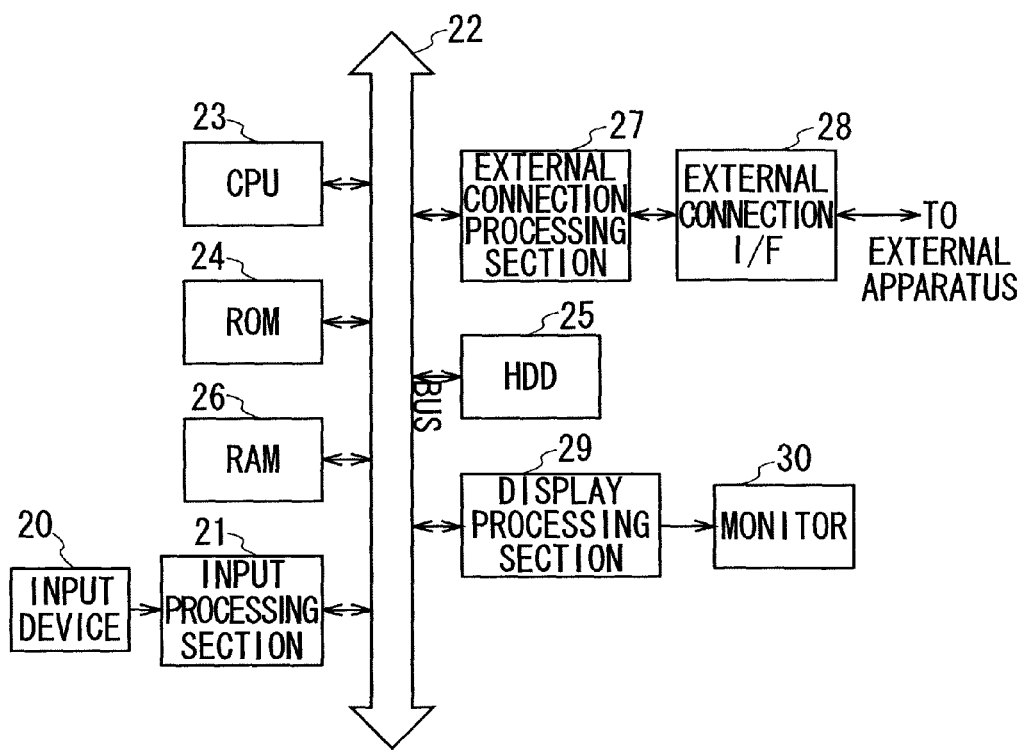
FIG. 5 is a block diagram showing a hardware configuration of a personal computer.

With reference to FIG. 5, a hardware configuration of the personal computer 3 will be described. When being operated by a user through an input device 20 such as a key board and a mouse, the personal computer 3 recognizes the operation through the input device 20 and transmits, to an input processing section 21, an operation input signal corresponding to the operation. The input processing section 21 applies predetermined processing to the supplied operation input signal to thereby convert the operation input signal into an operation command and transmits the operation command to a CPU 23 through a bus 22.

The CPU 23 of the personal computer 3 loads, into a RAM 26 through the bus 22, a basic program previously stored in a ROM 24 or hard disk drive 25, an application program, and various programs such as image browsing application YEP for external readout acquired from the abovementioned imaging apparatus 2. The CPU 23 then controls the entire operation of the personal computer 3 according to the various programs executed on the RAM 26, as well as performs predetermined calculation processing and various processing according to an operation command supplied from the input processing section 21.

Concretely, when the CPU 23 of the personal computer 3 is communicably connected to an external apparatus (in this case, imaging apparatus 2) through an external connection processing section 27 and an external connection interface 28 by a USB cable and receives the storage location management information of the externally accessible area 11b of the non-volatile memory 11 from the imaging apparatus 2, the CPU 23 recognizes the externally accessible area 11b as a mass storage according to the storage location management information, searches the externally accessible area 11b for the application recognition information YAF for external readout, and reads out the found application recognition information YAF for external readout. Subsequently, the CPU 23 reads out, from externally accessible area 11b, an application program (in this case, image browsing application YEP for external readout) indicated by the application recognition information YAF for external readout.

There is a possibility that the application recognition information YAF for external readout or an application program indicated by the application recognition information YAF for external readout stored in, e.g., an external storage medium such as a USB memory or hard disk drive or an electronic apparatus has been modified by a computer virus. In view of this, when a typical personal computer is communicably connected to the external storage medium or electronic apparatus storing the application recognition information YAF for external readout, it does not automatically execute an application program indicated by the application recognition information YAF for external readout but displays a screen for allowing a user to select execution of the application program indicated by the application recognition information YAF for external readout for security reason.

Figure 6:
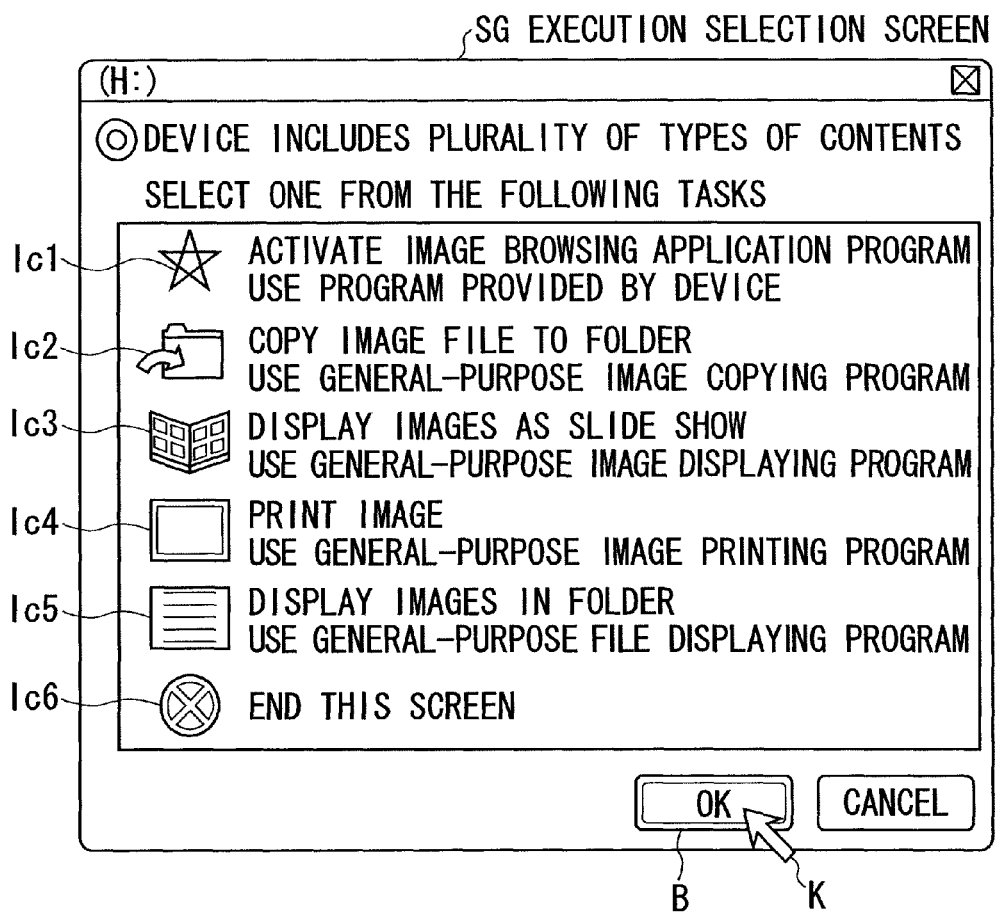
FIG. 6 is a view showing a configuration of an execution selection screen according to the first embodiment.
Figure 7:
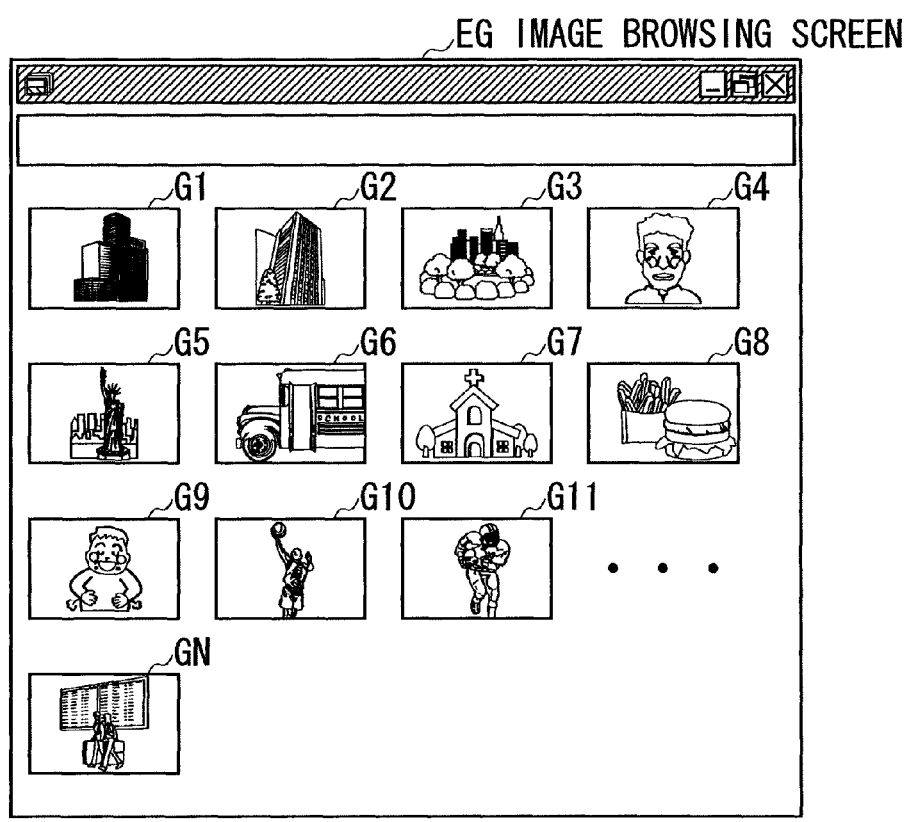
FIG. 7 is a view showing a configuration of an image browsing screen.

Thus, after reading out the application recognition information YAF for external readout from the externally accessible area 11b, the CPU 23 of the personal computer 3 generates an execution selection screen SG for allowing a user to select execution of the application program (in this case, image browsing application YEP for external readout) and displays the generated execution selection screen SG on a monitor 30 through a display processing section 29, as shown in FIG. 6.

Arranged on the execution selection screen SG are: an image browsing application execution icon Ic1 for executing the image browsing application YEP for external readout stored in the externally accessible area 11b of the imaging apparatus 2; an image copying application execution icon Ic2 for executing a general-purpose application program (i.e., application program previously stored in the personal computer 3) for copying an image file stored in the externally accessible area 11b of the imaging apparatus 2 to the personal computer 3 itself; an image displaying application execution icon Ic3 for executing a general-purpose application program for displaying, as a slide show, image files stored in the externally accessible area 11b of the imaging apparatus 2; an image printing application execution icon Ic4 for executing a general-purpose application program for printing an image file stored in the externally accessible area 11b of the imaging apparatus 2; an image file displaying application execution icon Ic5 for executing a general-purpose application program for displaying a list of image files stored in the externally accessible area 11b of the imaging apparatus 2; and an end icon Ic6 for ending the execution selection screen SG without execution of any of the above programs.

In this manner, in the case where the personal computer 3 is communicably connected to the imaging apparatus 2 and where the application recognition information YAF for external readout and image browsing application YEP for external readout are stored in the externally accessible area 11b of the non-volatile memory 11 in this imaging apparatus 2, the personal computer 3 generates the execution selection screen SG for display. With this configuration, only by communicably connecting to the imaging apparatus 2, the personal computer 3 can report to a user information indicating that the image browsing application YEP for external readout is stored in the imaging apparatus 2 and allow the user to select execution of the image browsing application YEP for external readout.

As a result of displaying the execution selection screen SG on the monitor 30 and a user operates through the input device 20, for example, when an OK button B is selected by a cursor K in a state where the image browsing application execution icon Ic1 of the execution selection screen SG displayed on the monitor 30 is selected, the CPU 23 of the personal computer 3 executes the image browsing application YEP for external readout.

Then, according to the image browsing application YEP for external readout, the CPU 23 of the personal computer 3 reads out, e.g., thumbnail images corresponding to a plurality of image files stored in the externally accessible area 11b of the imaging apparatus 2, generates an image browsing screen EG on which a list of the thumbnail images G (G1 to GN) is displayed, and displays the generated image browsing screen EG on the monitor 30 through the display processing section 29.

In this manner, when being communicably connected to the imaging apparatus 2 storing, in the externally accessible area 11b, the application recognition information YAF for external readout and image browsing application YEP for external readout, the personal computer 3 does not automatically execute the image browsing application YEP for external readout indicated by the application recognition information YAF for external readout but displays the execution selection screen SG for allowing a user to select execution of the image browsing application YEP for external readout. Then, when the execution of the image browsing application YEP for external readout is selected through a user's operation on the execution selection screen SG, the personal computer 3 executes the image browsing application YEP for external readout. With this configuration, even when the application recognition information YAF for external readout or image browsing application YEP for external readout that has illegally been modified by a computer virus is stored in the externally accessible area 11b of the imaging apparatus 2, it is possible to prevent the personal computer 3 from losing the opportunity to execute the proper image browsing application YEP for external readout as much as possible while reliably preventing the same from executing illegal processing according to the illegally modified application recognition information YAF for external readout or image browsing application YEP for external readout.

(1-4) Application Execution Processing Procedure in First Embodiment

Figure 8:
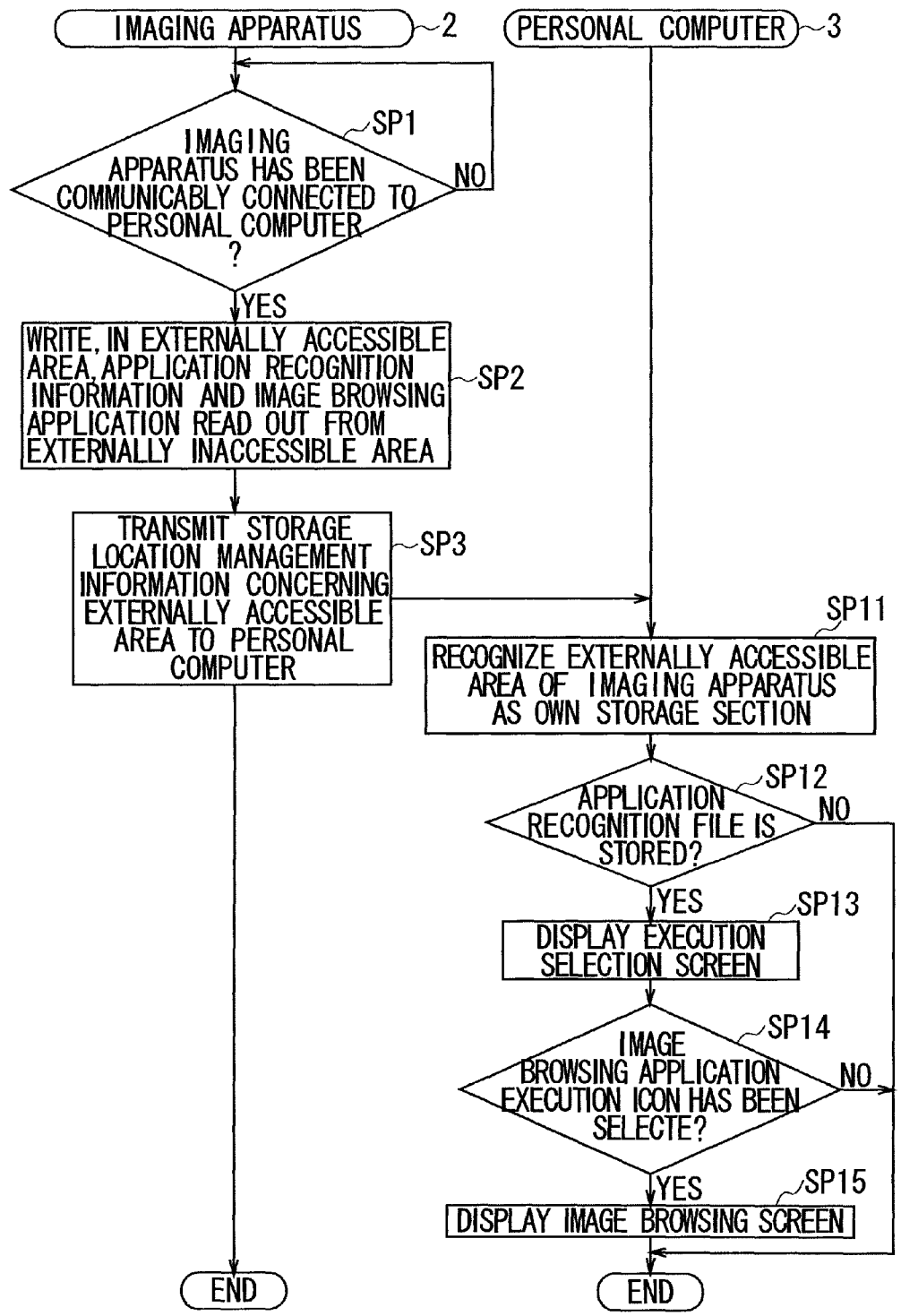
FIG. 8 is a flowchart showing an application execution processing procedure according to the first embodiment.

A processing procedure (hereinafter, referred to also as "application execution processing procedure") conducted when the personal computer 3 executes the image browsing application YEP for external readout stored in the imaging apparatus 2 in the abovementioned application execution system 1 will be described in detail with reference to the sequence chart of FIG. 8. The application execution processing procedure is a procedure of processing executed by the CPU 10 of the imaging apparatus 2 and CPU 23 of the personal computer 3.

When a power of the imaging apparatus 2 is turned ON by a user's operation through the operation section 14, the CPU 10 of the imaging apparatus 2 starts the application execution processing procedure and, then, proceeds to step SP1. In step SP1, the CPU 10 determines whether the imaging apparatus 2 has been communicably connected to the personal computer 3 through a USB cable. When a negative result is obtained in SP1, which means that the imaging apparatus 2 has not yet been communicably connected to the personal computer 3, so the CPU 10 repeats the processing of SP1.

On the other hand, when a positive result is obtained in step SP1, which means that the imaging apparatus 2 has been communicably connected to the personal computer 3, so the CPU 10 proceeds to step SP2.

In step SP2, the CPU 10 of the imaging apparatus 2 reads out the application recognition information AF and image browsing application EP specified by the write instruction information from the externally inaccessible area 11a of the non-volatile memory 11 and writes them in the externally accessible area 11b.

At this time, in the case where the application recognition information YAF for external readout and image browsing application YEP for external readout are not stored in the externally accessible area 11b, the CPU 10 of the imaging apparatus 2 writes, in the externally accessible area 11b, the application recognition information AF and image browsing application EP read out from the externally inaccessible area 11a. In the case where the application recognition information YAF for external readout and image browsing application YEP for external readout are not stored in the externally accessible area 11b, the CPU 10 overwrites the application recognition information YAF for external readout and image browsing application YEP for external readout with the application recognition information AF and image browsing application EP read out from the externally inaccessible area 11a and proceeds to step SP3.

In step SP3, the CPU 10 of the imaging apparatus 2 transmits, to the personal computer 3, the storage location management information concerning the externally accessible area 11b of the non-volatile memory 11 and ends the application execution processing procedure in the imaging apparatus 2.

Upon reception of the storage location management information transmitted from the imaging apparatus 2, the CPU 23 of the personal computer 3 recognizes the externally accessible area 11b of the imaging apparatus 2 as its own storage section in step SP11 and proceeds to step SP12.

In step SP12, the CPU 23 of the personal computer 3 searches the externally accessible area 11b of the imaging apparatus 2 for the application recognition information YAF for external readout to thereby determine whether the application recognition information YAF for external readout is stored in the externally accessible area 11b.

When a negative result is obtained in step SP12, which means that the application program to be read out is not stored in the externally accessible area 11b of the imaging apparatus 2, so the CPU 23 of the personal computer 3 ends the application execution processing procedure in the personal computer 3.

On the other hand, when a positive result is obtained in step SP12, which means that the application program to be read out is stored in the externally accessible area 11b of the imaging apparatus 2, so the CPU 23 of the personal computer 3 proceeds to step SP13.

In step SP13, the CPU 23 of the personal computer 3 reads out, from the externally accessible area 11b of the imaging apparatus 2, the image browsing application YEP for external readout indicated by the application recognition information YAF for external readout, displays the execution selection screen SG for allowing a user to select execution of the image browsing application YEP for external readout, and then proceeds to step SP14.

In step SP14, the CPU 23 of the personal computer 3 determines whether the image browsing application execution icon Ic1 on the execution selection screen SG has been selected by the user.

When a negative result is obtained in step SP14, which means that an icon other than the image browsing application execution icon Ic1 has been selected by the user on the execution selection screen SG, so the CPU 23 of the personal computer 3 executes a program specified by the icon other than the image browsing application execution icon Ic1 and ends the application execution processing procedure in the personal computer 3.

On the other hand, when a positive result is obtained in step SP14, which means that the user wants to execute the image browsing application YEP for external readout, so the CPU 23 of the personal computer 3 proceeds to step SP15.

In step SP15, the CPU 23 of the personal computer 3 displays the image browsing screen EG in response to the execution of the image browsing application YEP for external readout and ends the application execution processing procedure in the personal computer 3.

Through the above application execution processing procedure, the personal computer 3 allows the user to execute the image browsing application YEP for external readout read out from the imaging apparatus 2.

(1-5) Operation and Effects of First Embodiment

In the configuration described above, when the imaging apparatus 2 of the application execution system 1 is communicably connected to the personal computer 3, the imaging apparatus 2 reads out the proper application recognition information AF and image browsing application EP stored in the externally inaccessible area 11a of the non-volatile memory 11 and writes then in the externally accessible area 11b.

At this time, when the application recognition information YAF for external readout or image browsing application YEP for external readout is stored in the externally accessible area 11b of the non-volatile memory 11, the imaging apparatus 2 overwrites the application recognition information YAF for external readout or image browsing application YEP for external readout stored in the externally accessible area 11b with the proper application recognition information AF or image browsing application EP read out from the externally inaccessible area 11a of the non-volatile memory 11.

On the other hand, when the application recognition information YAF for external readout or image browsing application YEP for external readout is stored in the externally accessible area 11b of the non-volatile memory 11, the imaging apparatus 2 writes the proper application recognition information AF or image browsing application EP read out from the externally inaccessible area 11a of the non-volatile memory 11 in the externally accessible area 11b.

Thus, even when the application recognition information YAF for external readout or image browsing application YEP for external readout stored in the externally accessible area 11b of the non-volatile memory 11 was illegally modified by a computer virus or erroneously deleted by a user before the current connection time with the personal computer 3, the imaging apparatus 2 can store the proper application recognition information AF or image browsing application EP in the externally accessible area 11b before the personal computer 3 accesses the externally accessible area 11b in the current connection time, thereby allowing the personal computer 3 to reliably read out the proper application recognition information AF or image browsing application EP.

Further, when being communicably connected to the personal computer 3, the imaging apparatus 2 reads out not only the image browsing application EP but also the application recognition information AF from the externally inaccessible area 11a and writes them in the externally accessible area 11b.

Thus, even when the application recognition information YAF for external readout stored in the externally accessible area 11b of the non-volatile memory 11 was illegally been modified, before the current connection with the personal computer 3, in such a manner so as to allow an illegal program created by a computer virus to be executed, the imaging apparatus 2 can store the proper application recognition information AF or image browsing application EP in the externally accessible area 11b before the personal computer 3 accesses the externally accessible area 11b in the current connection time, thereby reliably preventing the personal computer 3 from reading out the illegal program for execution.

As described above, the imaging apparatus 2 of the application execution system 1 stores the proper application recognition information AF and image browsing application EP in the externally inaccessible area 11a for which read/write operation from the personal computer 3 is inhibited and stores the application recognition information YAF for external readout and image browsing application YEP for external readout in the externally accessible area 11b to which read/write operation from the personal computer 3 is permitted. When recognizing a communication connection to the personal computer 3, the imaging apparatus 2 reads out the application recognition information AF and image browsing application EP from the externally inaccessible area 11a and writes them in the externally accessible area 11b. With this configuration, when the application recognition information YAF for external readout or image browsing application YEP for external readout stored in the externally accessible area 11b has illegally been modified, the imaging apparatus 2 can overwrite the illegally modified application recognition information YAF for external readout or image browsing application YEP for external readout with the proper application recognition information AF or image browsing application EP stored in the externally inaccessible area 11a before the personal computer 3 accesses the externally accessible area 11b. As a result, when being communicably connected to the personal computer 3, the imaging apparatus 2 can allow the personal computer to read out the proper application recognition information AF or image browsing application EP.

(2) Second Embodiment

A second embodiment of the present invention will be described. The second embodiment differs from the first embodiment in that the CPU 10 of the imaging apparatus 2 has a function of comparing the application recognition information AF or image browsing application EP stored in the externally inaccessible area 11a of the imaging apparatus 2 and application recognition information YAF for external readout or image browsing application YEP for external readout stored in the externally accessible area 11b when the imaging apparatus 2 is communicably connected to the personal computer 3. Therefore, the present embodiment focuses on the comparison processing. The application execution system 1, imaging apparatus 2, and personal computer 3 have the same configurations as those in the first embodiment, so that repetitive description thereof will be omitted.

(2-1) Processing in Imaging Apparatus in Second Embodiment

Figure 9:
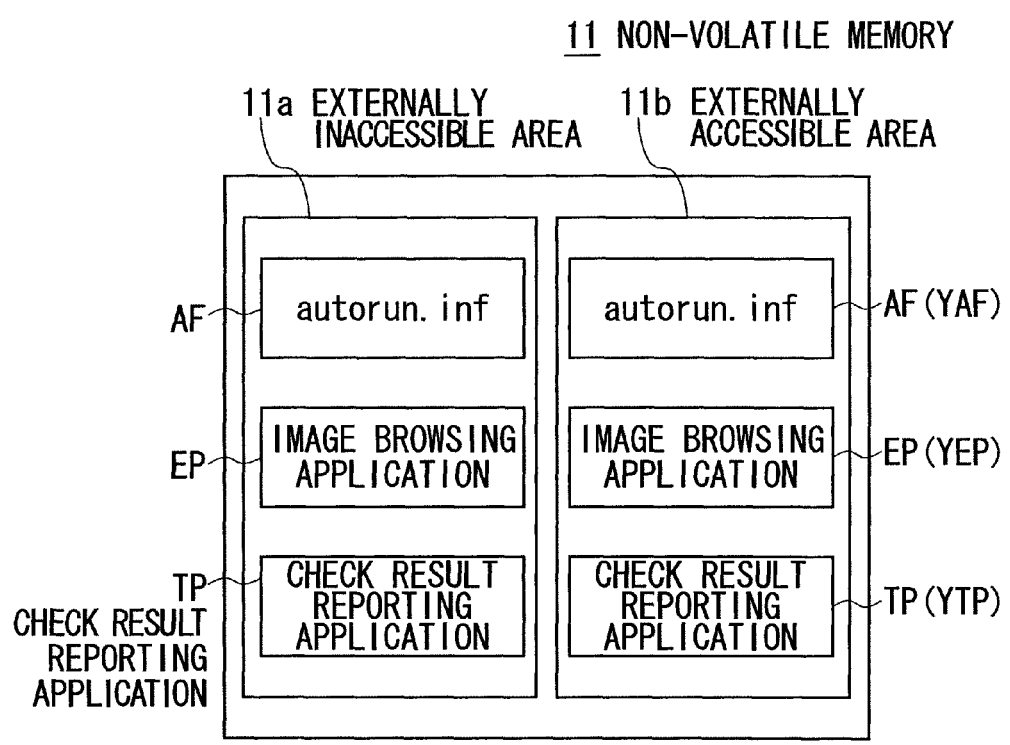
FIG. 9 is a view showing a configuration of the non-volatile memory according to a second embodiment.

As shown in FIG. 9, a proper application program (hereinafter, referred to as "check result reporting application") TP for reporting the check result for the application recognition information YAF for external readout or image browsing application YEP for external readout stored in the externally accessible area 11b of the imaging apparatus 2 is previously stored in the externally accessible area 11b of the imaging apparatus 2, in addition to the application recognition information AF and image browsing application EP described in the first embodiment. Further, a copy of the proper check result reporting application TP stored in the externally inaccessible area 11a is stored in the externally accessible area 11b of the imaging apparatus 2 so that the personal computer 3 can use it, in addition to the application recognition information YAF for external readout and image browsing application YEP for external readout described in the first embodiment.

The check result reporting application TP is indicated, together with the image browsing application EP (image browsing application YEP for external readout) by the application recognition information AF (application recognition information YAF for external readout) and is read out by the personal computer 3 according to the application recognition information AF when the imaging apparatus 2 is communicably connected to the personal computer 3 (that is, the application recognition information AF allows the personal computer 3 to recognize both the image browsing application EP and check result reporting application TP).

Thus, the imaging apparatus 2 stores the proper check result reporting application TP to be executed by the personal computer 3 in the externally inaccessible area 11a of the non-volatile memory 11 as well as stores a copy of the check result reporting application TP in the externally accessible area 11b in such a manner so as to allow the personal computer 3 to read out it for use. In the following description, the check result reporting application TP stored in the externally accessible area 11b of the non-volatile memory 11 is referred to as "check result reporting application YTP for external readout" for convenience so as to distinguish it from the proper check result reporting application TP stored in the externally inaccessible area 11a.

A checksum is previously added to each of the proper application recognition information AF, image browsing application EP, and check result reporting application TP stored in the externally inaccessible area 11a of the non-volatile memory 11. The checksum is a sum of numeric values each obtained by digitizing, according to a predetermined algorithm, a predetermined unit data obtained by dividing data (in this case, application recognition information AF, image browsing application EP, or check result reporting application TP).

Further, write instruction information is previously stored in the externally inaccessible area 11a of the non-volatile memory 11. When the imaging apparatus 2 is communicably connected to an external apparatus (in this case, personal computer 3), the write instruction information instructs reading out of the image browsing application EP, application recognition information AF, and check result reporting application TP from the externally inaccessible area 11a and writing of the read out image browsing application EP, application recognition information AF, and check result reporting application TP into the externally accessible area 11b.

When the CPU 10 of the imaging apparatus 2 recognizes, through the external connection section 17, that it has been communicably connected to the personal computer 3 through, e.g., a USB cable, the CPU 10 reads out the write instruction information from the externally inaccessible area 11a of the non-volatile memory 11. The CPU 10 of the imaging apparatus 2 then reads out the proper application recognition information AF, image browsing application EP, and check result reporting application TP specified by the write instruction information from the externally inaccessible area 11a of the non-volatile memory 11.

After reading out the proper application recognition information AF, image browsing application EP, and check result reporting application TP from the externally inaccessible area 11a of the non-volatile memory 11, the CPU 10 of the imaging apparatus 2 compares them with the application recognition information YAF for external readout, image browsing application YEP for external readout, and check result reporting application YTP for external readout that are supposed to be stored in the externally accessible area 11b.

At this time, in the case where the application recognition information YAF for external readout, image browsing application YEP for external readout, or check result reporting application YTP for external readout to be compared is not stored in the externally accessible area 11b of the non-volatile memory 11, the CPU 10 of the imaging apparatus 2 reads out the application recognition information AF, image browsing application EP, or check result reporting application TP from the externally inaccessible area 11a and writes them in the externally accessible area 11b as the application recognition information YAF for external readout, image browsing application YEP for external readout, or check result reporting application YTP for external readout, as in the case of the first embodiment.

In the case where the application recognition information YAF for external readout to be compared is stored in the externally accessible area 11b, the CPU 10 of the imaging apparatus 2 reads out the application recognition information YAF for external readout, newly calculates the checksum thereof, and compares the calculated checksum with the checksum added to the proper application recognition information AF read out from the externally inaccessible area 11a.

In the case where the checksum calculated from the application recognition information YAF for external readout and checksum added to the proper application recognition information AF differ from each other as a result of the comparison, the CPU 10 of the imaging apparatus 2 generates first check result information in which a rewrite flag indicating that a rewrite has been made is set to "1" and stores the generated first check result information in the externally accessible area 11b of the non-volatile memory 11. In the case where the checksum of the application recognition information YAF for external readout and checksum of the application recognition information AF coincide with each other as a result of the comparison, the CPU 10 generates the first check result information in which the rewrite flag is set to "0" and stores the generated first check result information in the externally accessible area 11b of the non-volatile memory 11. The CPU 10 of the imaging apparatus 2 then overwrites the application recognition information YAF for external readout with the proper application recognition information AF read out from the externally inaccessible area 11a, irrespective of whether the rewrite flag of the first check result information is set to "1".

Similarly, in the case where the image browsing application YEP for external readout to be compared is stored in the externally accessible area 11b, the CPU 10 of the imaging apparatus 2 reads out the image browsing application YEP for external readout, newly calculates the checksum thereof, and compares the calculated checksum with the checksum added to the proper image browsing application EP read out from the externally inaccessible area 11a.

In the case where the checksum calculated from the image browsing application YEP for external readout and checksum added to the proper image browsing application EP differ from each other as a result of the comparison, the CPU 10 of the imaging apparatus 2 generates second check result information in which a rewrite flag indicating that a rewrite has been made is set to "1" and stores the generated second check result information in the externally accessible area 11b of the non-volatile memory 11. In the case where the checksum of the image browsing application YEP for external readout and checksum of the image browsing application EP coincide with each other as a result of the comparison, the CPU 10 generates the second check result information in which the rewrite flag is set to "0" and stores the generated second check result information in the externally accessible area 11b of the non-volatile memory 11. The CPU 10 of the imaging apparatus 2 then overwrites the image browsing application YEP for external readout with the proper image browsing application EP read out from the externally inaccessible area 11a, irrespective of whether the rewrite flag of the second check result information is set to "1".

Similarly, in the case where the check result reporting application YTP for external readout to be compared is stored in the externally accessible area 11b, the CPU 10 of the imaging apparatus 2 reads out the check result reporting application YTP for external readout, newly calculates the checksum thereof, and compares the calculated checksum with the checksum added to the proper check result reporting application TP read out from the externally inaccessible area 11a.

In the case where the checksum calculated from the check result reporting application YTP for external readout and checksum added to the proper check result reporting application TP differ from each other as a result of the comparison, the CPU 10 of the imaging apparatus 2 generates third check result information in which a rewrite flag indicating that a rewrite has been made is set to "1" and stores the generated third check result information in the externally accessible area 11b of the non-volatile memory 11. In the case where the checksum of the check result reporting application YTP for external readout and checksum of the check result reporting application TP coincide with each other as a result of the comparison, the CPU 10 of the imaging apparatus 2 generates the third check result information in which the rewrite flag is set to "0" and stores the generated third check result information in the externally accessible area 11b of the non-volatile memory 11. The CPU 10 of the imaging apparatus 2 then overwrites the check result reporting application YTP for external readout with the proper check result reporting application TP read out from the externally inaccessible area 11a, irrespective of whether the rewrite flag of the third check result information is set to "1".

In this manner, the imaging apparatus 2 checks whether the application recognition information YAF for external readout, image browsing application YEP for external readout, and check result reporting application YTP for external readout stored in the externally accessible area 11b of the non-volatile memory 11 have been rewritten or not and stores, as the result of the rewrite check, the first to third check result information in the externally accessible area 11b. As a result, when the personal computer 3 executes the check result reporting application TP, a user can grasp the content of the first to third check result information.

Further, the imaging apparatus 2 overwrites the application recognition information YAF for external readout, image browsing application YEP for external readout, and check result reporting application YTP for external readout stored in the externally accessible area 11b with the proper application recognition information AF, image browsing application EP, and check result reporting application TP read out from the externally inaccessible area 11a, irrespective of the check result about whether the application recognition information YAF for external readout, image browsing application YEP for external readout, and check result reporting application YTP for external readout stored in the externally accessible area 11b of the non-volatile memory 11 have been rewritten or not. With this configuration, even when the application recognition information YAF for external readout, image browsing application YEP for external readout, or check result reporting application YTP for external readout has illegally been modified so cleverly that it is hard to detect the modification, it is possible to reliably prevent the personal computer 3 from reading out the illegally modified application recognition information YAF for external readout, image browsing application YEP for external readout, or check result reporting application YTP for external readout.

(2-2) Processing in Personal Computer in Second Embodiment

When the CPU 23 of the personal computer 3 is communicably connected to an external apparatus (in this case, imaging apparatus 2) through the external connection processing section 27 and external connection interface 28 by a USB cable and receives the storage location management information of the externally accessible area 11b of the non-volatile memory 11 from the imaging apparatus 2, the CPU 23 recognizes the externally accessible area 11b as its own storage section and reads out the application recognition information YAF for external readout (i.e., proper application recognition information AF) from the externally accessible area 11b. Subsequently, the CPU 23 reads out, from externally accessible area 11b, an application program (in this case, both the image browsing application YEP for external readout and check result reporting application YTP for external readout, i.e., both the image browsing application EP and check result reporting application TP) indicated by the application recognition information YAF for external readout.

Figure 10:
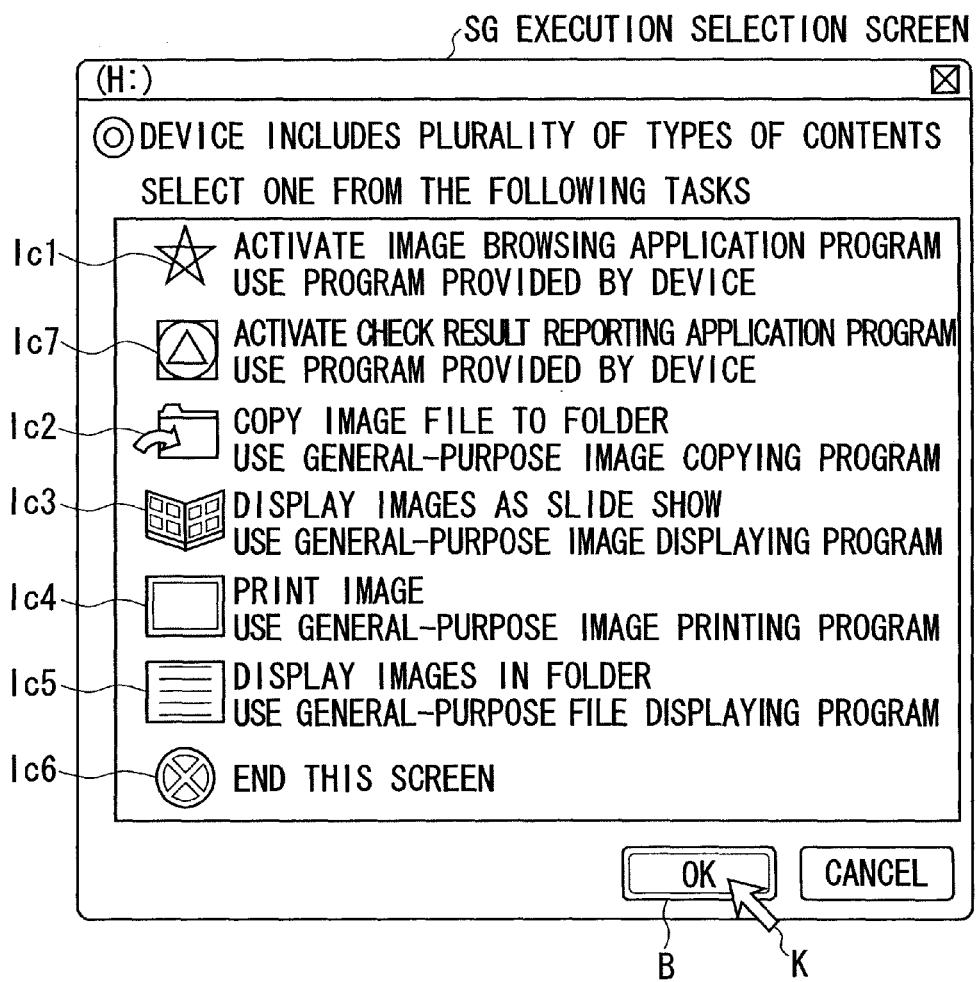
FIG. 10 is a view showing a configuration of an execution selection screen according to the second embodiment.

After reading out the application recognition information AF from the externally accessible area 11b, the CPU 23 of the personal computer 3 generates the execution selection screen SG for allowing a user to select execution of the image browsing application EP and check result reporting application TP indicated by the application recognition information AF and displays the generated execution selection screen SG on the monitor 30 through the display processing section 29, as shown in FIG. 10.

As in the case of the first embodiment, the image browsing application execution icon Ic1, image copying application execution icon Ic2, image displaying application execution icon Ic3, image printing application execution icon Ic4, image file displaying application execution icon Ic5, and end icon Ic6 are arranged on the execution selection screen SG.

In addition to the above icons, a check result reporting application execution icon Ic7 for executing the check result reporting application TP is arranged on the execution selection screen SG at a position between the image browsing application execution icon Ic1 and image copying application execution icon Ic2.

When an OK button B is selected through a user's operation using a cursor K in a state where the check result reporting application execution icon Ic7 of the execution selection screen SG displayed on the monitor 30 is selected, the CPU 23 of the personal computer 3 executes the check result reporting application TP.

Figure 11:
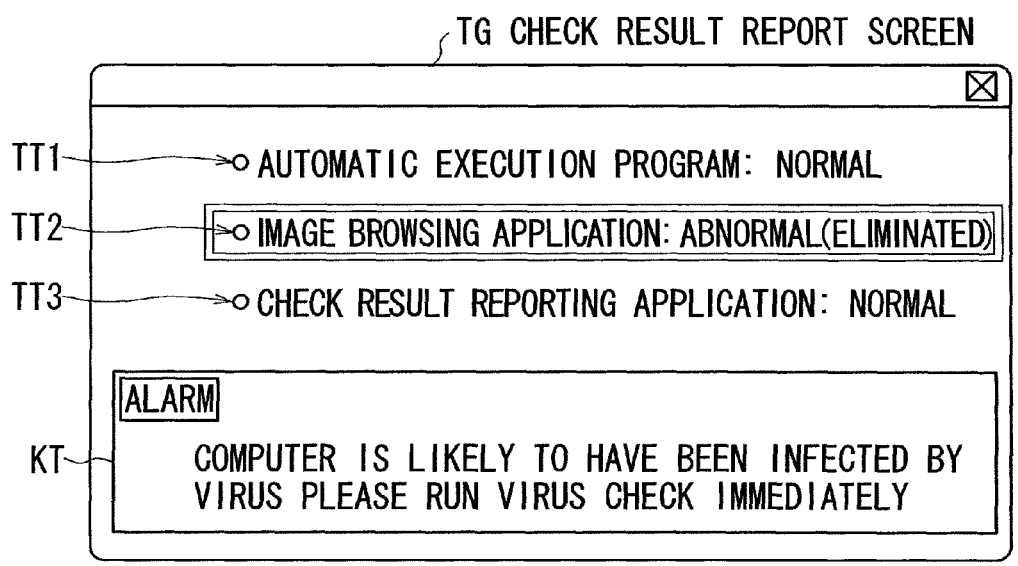
FIG. 11 is a view showing a configuration of a check result report screen.

Upon execution of the check result reporting application TP, the CPU 23 of the personal computer 3 reads out, according to the check result reporting application TP, the first to third check result information stored in the externally accessible area 11b of the imaging apparatus 2, generates a check result report screen TG corresponding to the first to third check result information, and displays it on the monitor 30 through the display processing section 29, as shown in FIG. 11.

It is assumed here that "0" is set as the rewrite flag of the first check result information, "1" is set as the rewrite flag of the second check result information, and "0" is set as the rewrite flag of the third check result information.

On the check result report screen TG, a first report text TT1 indicating that a program (in this case, application recognition information YAF for external readout) corresponding to the first check result information in which the rewrite flag is set to "0" has not been rewritten (i.e., normal) is displayed according to the first check result information. Further, on the check result report screen TG, a second report text TT2 indicating that a program (in this case, image browsing application YEP for external readout) corresponding to the second check result information in which the rewrite flag is set to "1" has been rewritten and has been overwritten with the proper image browsing application EP (i.e., although there was an abnormality, it has already been eliminated) is displayed in a highlighted manner according to the second check result information. Further, on the check result report screen TG, a third report text TT3 indicating that a program (in this case, check result reporting application TP) corresponding to the third check result information in which the rewrite flag is set to "0" has not been rewritten is displayed according to the third check result information.

Furthermore, on the check result report screen TG, an alarm text KT for informing that, for example, the personal computer 3 has been infected by a computer virus is displayed in response to a fact that there exists a rewritten program (in this case, image browsing application YEP for external readout corresponding to the second check result information).

In this manner, when communication connection between the personal computer 3 and imaging apparatus 2 is established and the check result reporting application execution icon Ic7 on the execution selection screen SG is selected by the user, the personal computer 3 displays the check result report screen TG corresponding to the check result reporting application TP and first to third check result information stored in the externally accessible area 11b of the imaging apparatus 2 to thereby report, to the user, whether the application recognition information YAF for external readout, image browsing application YEP for external readout, or check result reporting application YTP for external readout stored in the externally accessible area 11b of the imaging apparatus 2 has illegally been modified or not.

With this configuration, even in the case where, for example, application recognition information YAF for external readout, image browsing application YEP for external readout, or check result reporting application YTP for external readout stored in the externally accessible area 11b of the imaging apparatus 2 was illegally modified in the previous connection time between the imaging apparatus 2 and personal computer 3 since the computer 3 had been infected by a computer virus, the personal computer 3 can report to the user that the personal computer 3 itself is likely to have been infected by the computer virus, thereby avoiding a situation where another computer connected to the personal computer 3 through a network or electronic apparatus communicably connected to the personal computer 3 is infected by the computer virus, or where the storage content of another computer 3 or electronic apparatus connected to the personal computer 3 is illegally modified by the computer virus.

(2-3) Application Execution Processing Procedure in Second Embodiment

An application execution processing procedure conducted when the personal computer 3 executes the check result reporting application TP stored in the imaging apparatus 2 in the abovementioned application execution system 1 according to the second embodiment will be described in detail with reference to the sequence charts of FIGS. 12 and 13. The application execution processing procedure is a procedure of processing executed by the CPU 10 of the imaging apparatus 2 and CPU 23 of the personal computer 3.

Figure 12:
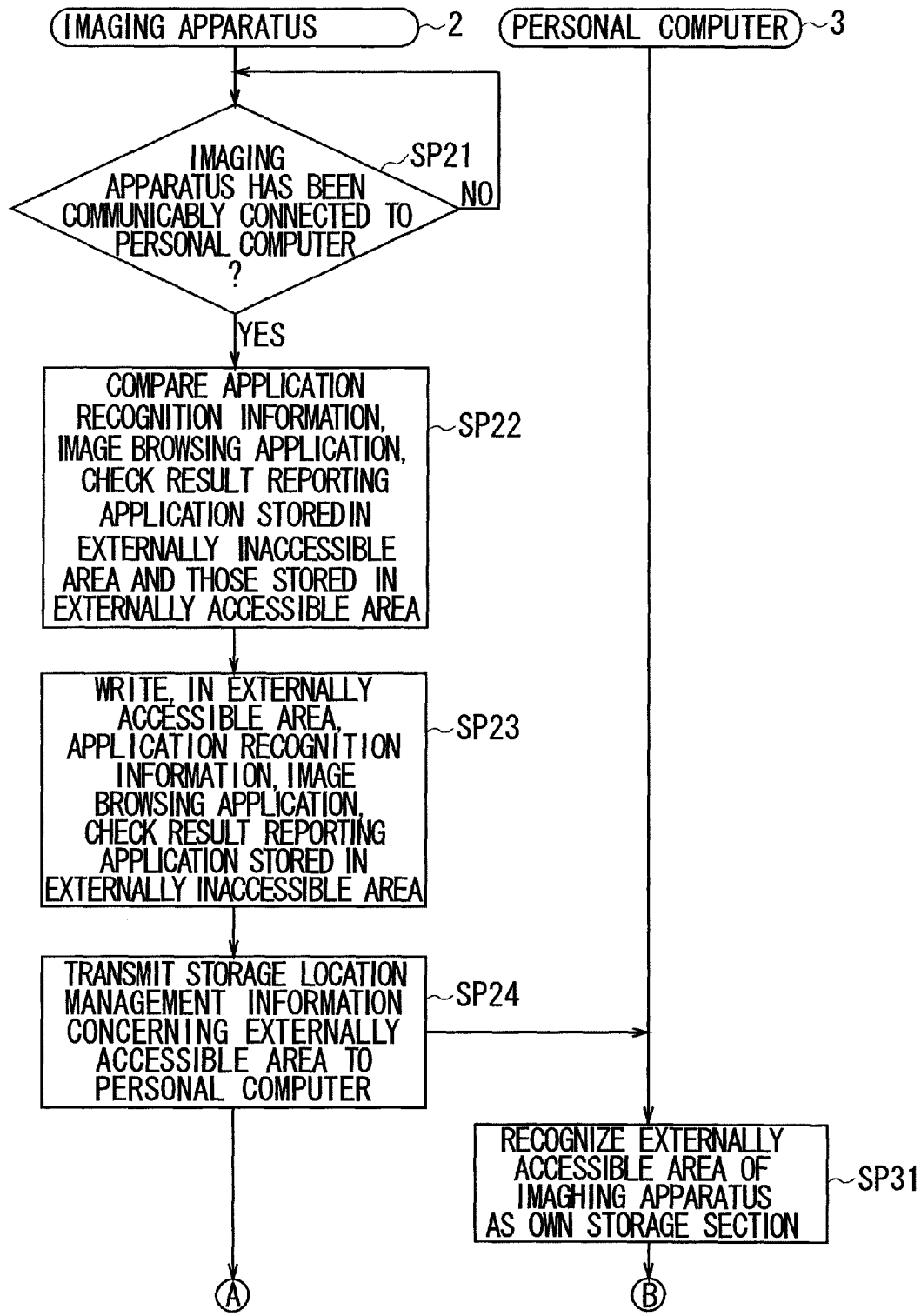
FIG. 12 is a flowchart (1) showing an application execution processing procedure according to the second embodiment.

When a power of the imaging apparatus 2 is turned ON by a user's operation through the operation section 14, the CPU 10 of the imaging apparatus 2 starts the application execution processing procedure and then proceeds to step SP21 (FIG. 12). In step SP21, the CPU 10 determines whether the imaging apparatus 2 has been communicably connected to the personal computer 3 through a USB cable. When a negative result is obtained in step SP21, which means that the imaging apparatus 2 has not yet been communicably connected to the personal computer 3, so the CPU 10 repeats the processing of step SP21.

On the other hand, when a positive result is obtained in step SP21, which means that the imaging apparatus 2 has been communicably connected to the personal computer 3, so the CPU 10 proceeds to step SP22.

In step SP22, the CPU 10 of the imaging apparatus 2 reads out the proper application recognition information AF, image browsing application EP, and check result reporting application TP specified by the write instruction information from the externally inaccessible area 11a of the non-volatile memory 11 and compares them with application recognition information YAF for external readout, image browsing application YEP for external readout, and check result reporting application YTP for external readout stored in the externally accessible area 11b.

In the case where the application recognition information YAF for external readout, image browsing application YEP for external readout, or check result reporting application YTP for external readout to be compared is stored in the externally accessible area 11b, the CPU 10 of the imaging apparatus 2 reads out it, calculates the checksum thereof, and compares the calculated checksum with the checksum added to the proper application recognition information AF, image browsing application EP, or check result reporting application TP read out from the externally inaccessible area 11a. The CPU 10 then generates the first to third check result information as a comparison result and stores them in the externally accessible area 11b. In the case where the application recognition information YAF for external readout, image browsing application YEP for external readout, or check result reporting application YTP for external readout to be compared is not stored in the externally accessible area 11b, the CPU 10 of the imaging apparatus 2 does not perform comparison processing, but directly proceeds to step SP23.

In step SP23, the CPU 10 of the imaging apparatus 2 writes the application recognition information AF, image browsing application EP, or check result reporting application TP read out from the externally inaccessible area 11a in the externally accessible area 11b.

At this time, in the case where the application recognition information YAF for external readout, image browsing application YEP for external readout, or check result reporting application YTP for external readout is not stored in the externally accessible area 11b, the CPU 10 of the imaging apparatus 2 writes, in the externally accessible area 11b, the proper application recognition information AF, image browsing application EP, or check result reporting application TP read out from the externally inaccessible area 11a. In the case where the application recognition information YAF for external readout, image browsing application YEP for external readout, or check result reporting application YTP for external readout is stored in the externally accessible area 11b, the CPU 10 of the imaging apparatus 2 overwrites the application recognition information YAF for external readout, image browsing application YEP for external readout, or check result reporting application YTP for external readout with the proper application recognition information AF, image browsing application EP, or check result reporting application TP read out from the externally inaccessible area 11a and then proceeds to step SP24.

In step SP24, the CPU 10 of the imaging apparatus 2 transmits, to the personal computer 3, the storage location management information concerning the externally accessible area 11b of the non-volatile memory 11 and ends the application execution processing procedure in the imaging apparatus 2.

Figure 13:
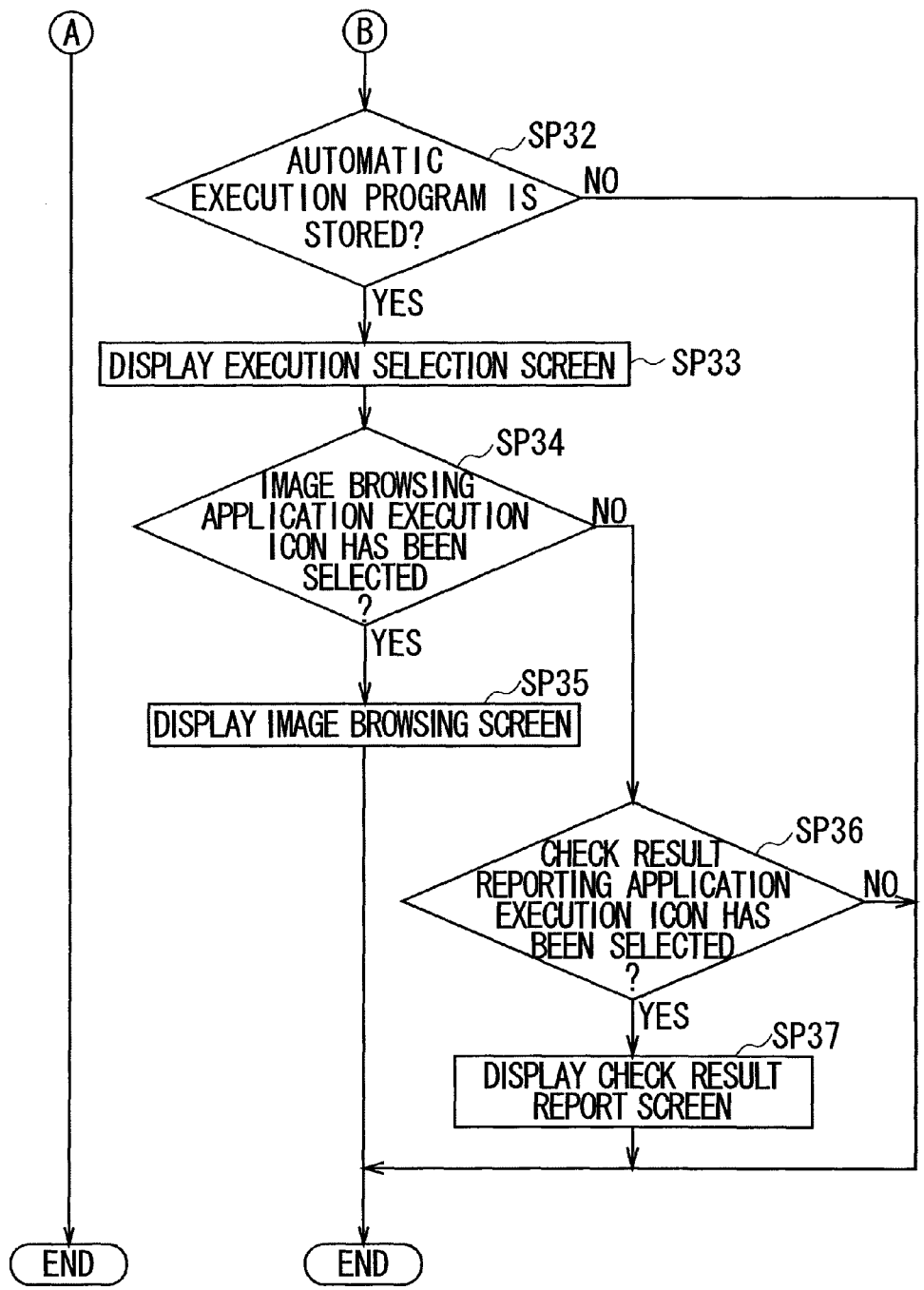
FIG. 13 is a flowchart (2) showing an application execution processing procedure according to the second embodiment.

Upon reception of the storage location management information transmitted from the imaging apparatus 2, the CPU 23 of the personal computer 3 recognizes the externally accessible area 11b of the imaging apparatus 2 as its own storage section in step SP31 and then proceeds to step SP32 (FIG. 13).

In step SP32, the CPU 23 of the personal computer 3 searches the externally accessible area 11b of the imaging apparatus 2 for the application recognition information YAF for external readout to thereby determine whether the application recognition information YAF for external readout is stored in the externally accessible area 11b.

When a negative result is obtained in step SP32, which means that the application program to be read out is not stored in the externally accessible area 11b of the imaging apparatus 2, so the CPU 23 of the personal computer 3 ends the application execution processing procedure in the personal computer 3.

On the other hand, when a positive result is obtained in step SP32, which means that the application program to be read out is stored in the externally accessible area 11b of the imaging apparatus 2, so the CPU 23 of the personal computer 3 proceeds to step SP33.

In step SP33, the CPU 23 of the personal computer 3 reads out, from the externally accessible area 11b of the imaging apparatus 2, the image browsing application YEP for external readout and check result reporting application TP indicated by the application recognition information YAF for external readout, displays the execution selection screen SG for allowing a user to select execution of the image browsing application YEP for external readout and check result reporting application TP, and then proceeds to step SP34.

In step SP34, the CPU 23 of the personal computer 3 determines whether the image browsing application execution icon Ic1 on the execution selection screen SG has been selected by the user.

When a positive result is obtained in step SP34, which means that the user wants to execute the image browsing application YEP for external readout stored in the externally accessible area 11b of the imaging apparatus 2, so the CPU 23 of the personal computer 3 proceeds to step SP35.

In step SP35, the CPU 23 of the personal computer 3 displays the image browsing screen EG according to the execution of the image browsing application YEP for external readout and ends the application execution processing procedure in the personal computer 3.

On the other hand, when a negative result is obtained in step SP34, which means that an icon other than the image browsing application execution icon Ic1 has been selected by the user on the execution selection screen SG, so the CPU 23 of the personal computer 3 proceeds to step SP36.

In step SP36, the CPU 23 of the personal computer 3 determines whether the check result reporting application execution icon Ic7 on the execution selection screen SG has been selected by the user.

When a positive result is obtained in step SP36, which means that the user wants to execute the check result reporting application TP, so the CPU 23 of the personal computer 3 proceeds to step SP37.

In step SP 37, the CPU 23 of the personal computer 3 displays the check result report screen TG in response to the execution of the check result reporting application TP and ends the application execution processing procedure in the personal computer 3.

On the other hand, when a negative result is obtained in step SP36, which means that an icon other than the image browsing application execution icon Ic1 and check result reporting application execution icon Ic7 has been selected by the user on the execution selection screen SG, so the CPU 23 of the personal computer 23 executes a program corresponding to the icon other than the image browsing application execution icon Ic1 and check result reporting application execution icon Ic7 and ends the application execution processing procedure in the personal computer 3.

Through the above application execution processing procedure, the personal computer 3 allows the user to execute the image browsing application YEP for external readout and check result reporting application TP.

(2-4) Operation and Effects of Second Embodiment

In the configuration described above, when the imaging apparatus 2 of the application execution system 1 is communicably connected to the personal computer 3, the imaging apparatus 2 compares the application recognition information YAF for external readout, image browsing application YEP for external readout, and check result reporting application YTP for external readout stored in the externally accessible area 11b with application recognition information AF, image browsing application EP, and check result reporting application TP stored in the externally inaccessible area 11a. The imaging apparatus 2 then stores, as the comparison result, the first to third check result information in the externally accessible area 11b.

With this configuration, when the storage content of the externally accessible area 11b was illegally modified by a computer virus in the previous connection time to the personal computer 3 that had been infected by the computer virus, the imaging apparatus 2 can report to a user that the personal computer 3 is likely to have been infected by the computer virus in the current connection time.

As described above, when the imaging apparatus 2 of the application execution system 1 is communicably connected to the personal computer 3, the imaging apparatus 2 compares the application recognition information YAF for external readout, image browsing application YEP for external readout, and check result reporting application YTP for external readout stored in the externally accessible area 11b with application recognition information AF, image browsing application EP, and check result reporting application TP stored in the externally inaccessible area 11a and then stores, as the comparison result, the first to third check result information in the externally accessible area 11b. With this configuration, when the storage content of the externally accessible area 11b was illegally modified by a computer virus in the previous connection time to the personal computer 3 that had been infected by the computer virus, the imaging apparatus 2 can report to a user that the personal computer 3 is likely to have been infected by the computer virus in the current connection time, thereby avoiding a situation where another computer connected to the personal computer 3 through a network or electronic apparatus communicably connected to the personal computer 3 is infected by the computer virus, or where the storage content of another personal computer or electronic apparatus connected to the personal computer 3 is illegally modified by the computer virus.

(3) Other Embodiments

Figure 14:
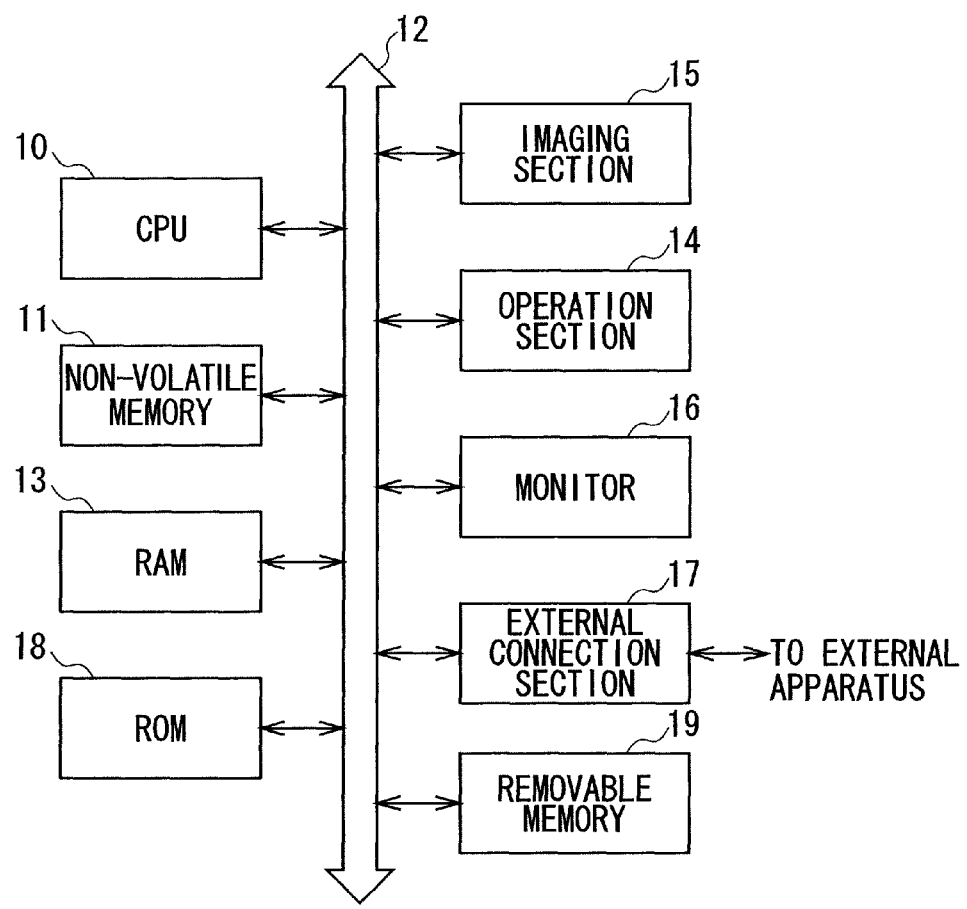
FIG. 14 is a block diagram showing a hardware configuration of the imaging apparatus according to another embodiment.

Although the non-volatile memory 11 of the imaging apparatus 2 is divided into the externally inaccessible area 11a and externally accessible area 11b in the above first and second embodiments, the configuration of the present invention is not limited to this but, as shown in FIG. 14, a read only memory (ROM) 18 in which rewrite of data is inhibited in principle may be provided as the externally inaccessible area 11a. In this case, the rewrite of the storage content is principally impossible, thereby increasing the security level of the imaging apparatus 2. Alternatively, a removable memory 19 may be detachably provided to the imaging apparatus 2 as the externally accessible area 11b. Further alternatively, a hard disk drive, etc. may be used as the externally inaccessible area 11a or externally accessible area 11b in place of the non-volatile memory 11. As described above, it is possible to freely design a configuration for realizing the externally inaccessible area 11a and externally accessible area 11b.

In the case where the removable memory 19 is used as the externally accessible area 11b, since the application recognition information YAF for external readout, image browsing application YEP for external readout, and check result reporting application TP are not previously stored in the removable memory 19, processing that stores, in the removable memory 19, the application recognition information YAF for external readout, image browsing application YEP for external readout, and check result reporting application TP for external readout at the time when the removable memory 19 is connected to the imaging apparatus 2 or when the imaging apparatus 2 is communicably connected to the personal computer 3 for the first time may be added.

Further, although the present invention is applied to the imaging apparatus 2 that photographs an object and generates an image file based on the photographed object in the first and second embodiment, it may be applied to an imaging apparatus that photographs an object and generates a video file based on the photographed object, a portable-type audio apparatus that stores music files, a portable-type game apparatus that stores game files, or an external storage unit storing various types of files. That is, the present invention may be applied to various electronic apparatuses storing various types of content.

Further, although the proper application recognition information AF, image browsing application EP, and check result reporting application TP stored in the externally accessible area 11b are read out and the application recognition information YAF for external readout, image browsing application YEP for external readout, and check result reporting application TP for external readout are overwritten with the read out proper application recognition information AF, image browsing application EP, and check result reporting application TP in the first and second embodiments, the configuration of the present invention is not limited to this but another configuration may be employed in which even when a read-only attribute (i.e., overwrite inhibition attribute) is set for the application recognition information YAF for external readout, image browsing application YEP for external readout, and check result reporting application YTP for external readout stored in the externally accessible area 11b, the proper application recognition information AF, image browsing application EP, and check result reporting application TP stored in the externally accessible area 11b can be read out for overwriting the application recognition information YAF for external readout, image browsing application YEP for external readout, and check result reporting application YTP for external readout stored in the externally accessible area 11b therewith.

With this configuration, even in the case where, for example, application recognition information YAF for external readout, image browsing application YEP for external readout, or check result reporting application YTP for external readout stored in the externally accessible area 11b of the non-volatile memory 11 was illegally modified in the previous connection time between the imaging apparatus 2 and personal computer 3 since the computer 3 had been infected by a computer virus and where the read-only attribute is set for the illegally modified application recognition information YAF for external readout, image browsing application YEP for external readout, or check result reporting application YTP for external readout, the imaging apparatus 2 can overwrite the illegally modified application recognition information YAF for external readout or image browsing application YEP for external readout with the proper application recognition information AF or image browsing application EP stored in the externally inaccessible area 11a before the personal computer 3 accesses the externally accessible area 11b in the current connection time, thereby allowing the personal computer 3 to reliably read out the proper program.

Further, although the imaging apparatus 2 and personal computer 3 are communicably connected to each other by using the USB cable in the first and second embodiments, another type cable or a wireless local area network (LAN) may be employed to establish the communication connection between the imaging apparatus 2 and personal computer 3.

Further, although the application recognition information YAF for external readout, image browsing application YEP for external readout, or check result reporting application YTP for external readout stored in the externally accessible area 11b is overwritten with the application recognition information AF, image browsing application EP, or check result reporting application TP read out from the externally inaccessible area 11a in the first and second embodiments, the configuration of the present invention is not limited to this but another configuration may be employed in which the application recognition information AF, image browsing application EP, or check result reporting application TP read out from the externally inaccessible area 11a may be written in the externally accessible area 11b after deletion of the application recognition information YAF for external readout, image browsing application YEP for external readout, or check result reporting application YTP for external readout stored in the externally accessible area 11b.

Further, although the application recognition information YAF for external readout, image browsing application YEP for external readout, and check result reporting application YTP for external readout are stored in the imaging apparatus 2 in the first and second embodiments, any other type of application program such as a video reproduction application program or a music reproduction application program, as well as a program for issuing an alarm sound or displaying a predetermined image may be stored. Such application programs may be stored singularly or in combination.

Further, although the check result reporting application TP is stored in the imaging apparatus 2 side in the second embodiment, the check result reporting application TP may be stored in the personal computer 3 side. In this case, the check result reporting application TP is executed after the personal computer 3 is communicably connected to the imaging apparatus 2 and set up as a mass storage.

Further, although the check result reporting application TP is executed by the personal computer 3 in the second embodiment, the check result reporting application TP may be executed by the imaging apparatus 2. In this case, the imaging apparatus 2 can directly (without mediation of the personal computer 2) report to the user a check result and an alarm associated with the check result.

Further, although the checksums of the application recognition information YAF for external readout, image browsing application YEP for external readout, and check result reporting application YTP for external readout stored in the externally inaccessible area 11a are compared with the checksums calculated from those stored in the externally accessible area 11b in the second embodiment, the comparison method is not especially limited but they may be compared with each other in terms of the data amount, update history, or the like.

Further, in this case, when determining, as a result of the comparison, that the proper application recognition information AF, image browsing application EP, and check result reporting application TP stored in the externally inaccessible area 11a coincide with the application recognition information YAF for external readout, image browsing application YEP for external readout, and check result reporting application YTP for external readout stored in the externally accessible area 11b, the imaging apparatus 2 may skip the processing of overwriting the application recognition information YAF for external readout, image browsing application YEP for external readout, and check result reporting application YTP for external readout stored in the externally accessible area 11b with the proper application recognition information AF, image browsing application EP, and check result reporting application TP, thereby reducing the number of processing steps in the imaging apparatus 2 by that much, as well as preventing the number of write operations that can be made to the non-volatile memory 11 from being decreased.

Further, although the personal computer 3 displays the check result report screen TG for reporting to the user, according to the check result reporting application TP, whether illegal modification has been made or not in the second embodiment, the configuration of the present invention is not limited to this but any type of configuration may be used for the check result report screen TG. For example, the check result report screen TG may sound an alarm or automatically activate a virus check application so as to report whether illegal modification has been made or not. That is, the type and function of the application program for reporting to the user whether illegal modification has been made or not are not limited.

Further, although the imaging apparatus 2 performs the comparison (check) processing when the application recognition information YAF for external readout, image browsing application YEP for external readout, or check result reporting application YTP for external readout is stored in the externally accessible area 11b to thereby generate the first to third check result information as the comparison result in the second embodiment, the configuration of the present invention is not limited to this but the comparison results may be integrated into one check result information. Alternatively, a plurality of check items may be set and plurality of check result information corresponding to the respective check items may be generated.

Further, in this case, the imaging apparatus 2 may delete the thus generated first to third check result information in the subsequent communication connection time to the personal computer or may leave them as a log. That is, the number of the check result information to be generated or subsequent treatment therefore can freely be set.

Further, in this case, even when the application recognition information YAF for external readout, image browsing application YEP for external readout or check result reporting application YTP for external readout is not stored in the externally accessible area 11b, the imaging apparatus 2 may generate check result information indicating that the application recognition information YAF for external readout, image browsing application YEP for external readout or check result reporting application YTP for external readout is not stored in the externally accessible area 11b. With this configuration, the imaging apparatus 2 can inform the personal computer 3 whether the storage content of the externally accessible area 11b has been rewritten or not or that the storage content of the externally accessible area 11b has been deleted.

The present invention is not limited to the above embodiments and modifications thereof but includes an embodiment obtained by arbitrarily combining a part or all of the first embodiment, second embodiment, and modifications thereof or an embodiment obtained by extracting a part therefrom.

The present invention can suitably applied to an apparatus allowing a personal computer to read out a program stored in the apparatus itself when being communicably connected to the personal computer.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a communication connection section that is communicably connected to an external apparatus;
a first storage section that stores a predetermined program to be executed by the external apparatus, and for which read/write operation from the external apparatus is inhibited;
a second storage section to which read/write operation from the external apparatus is permitted; and
a write section, including a processor, that reads out the predetermined program stored in the first storage section when the information processing apparatus is communicably connected to the external apparatus by the communication connection section and writes the read out program in the second storage section such that the external apparatus executes the program in the second storage section by communicating with the second storage section through the communication connection section;
wherein in the case where the predetermined program is stored in the second storage section, the write section reads out the predetermined program stored in the first storage section and overwrites the predetermined program stored in the second storage section with the read out program;
wherein even when an overwrite inhibition attribute that inhibits the predetermined program from being overwritten is set for the predetermined program stored in the second storage section, the write section overwrites the predetermined program with the program stored in the first storage section.

2. The information processing apparatus according to claim 1, further comprising:
   a comparison section that compares, before the predetermined program stored in the second storage section is overwritten, the predetermined program stored in the first storage section and predetermined program stored in the second storage section; and
   an information generation section that generates comparison result information indicating a result of the comparison performed by the comparison section,
   wherein the write section writes the comparison result information generated by the information generation section in the second storage section.

3. The information processing apparatus according to claim 1, wherein the first storage section stores program recognition information for allowing the external computer to recognize the predetermined program, and the write section reads out the predetermined program and program recognition information stored in the first storage section when the information processing apparatus is communicably connected to the external apparatus by the communication connection section and writes the read out program and information in the second storage section.

4. An information processing method comprising:
   establishing a communication connection to an external apparatus; and
   reading out, using a processor, a predetermined program stored in a first storage section for which read/write operation from the external apparatus is inhibited and writing the read out program in a second storage section to which read/write operation from the external apparatus is permitted; and
   receiving communications from the external apparatus as the external apparatus executes the program in the second storage section;
   wherein in the case where the predetermined program is stored in the second storage section, the write section reads out the predetermined program stored in the first storage section and overwrites the predetermined program stored in the second storage section with the read out program;
   wherein even when an overwrite inhibition attribute that inhibits the predetermined program from being overwritten is set for the predetermined program stored in the second storage section, the write section overwrites the predetermined program with the program stored in the first storage section.

5. A non-transitory computer readable medium encoded with a program that causes a computer to execute a method comprising:
   establishing a communication connection to an external apparatus;
   reading out, using a processor, a predetermined program stored in a first storage section for which read/write operation from the external apparatus is inhibited and writing the read out program in a second storage section to which read/write operation from the external apparatus is permitted; and
   receiving communications from the external apparatus as the external apparatus executes the program in the second storage section;
   wherein in the case where the predetermined program is stored in the second storage section, the write section reads out the predetermined program stored in the first storage section and overwrites the predetermined program stored in the second storage section with the read out program;
   wherein even when an overwrite inhibition attribute that inhibits the predetermined program from being overwritten is set for the predetermined program stored in the second storage section, the write section overwrites the predetermined program with the program stored in the first storage section.

6. An information processing system comprising:
   an information processing apparatus including
      a communication connection section that is communicably connected to an external apparatus;
      a first storage section that stores a predetermined program to be executed by the external apparatus, and for which read/write operation from the external apparatus is inhibited;
      a second storage section to which read/write operation from the external apparatus is permitted; and
      a write section, including a processor, that reads out the predetermined program stored in the first storage section when the information processing apparatus is communicably connected to the external apparatus by the communication connection section and writes the read out program in the second storage section; and
   the external apparatus configured to execute the program in the second storage section of the information processing apparatus by communicating with the second storage section through the communication connection section of the information processing apparatus;
   wherein in the case where the predetermined program is stored in the second storage section, the write section reads out the predetermined program stored in the first storage section and overwrites the predetermined program stored in the second storage section with the read out program;
   wherein even when an overwrite inhibition attribute that inhibits the predetermined program from being overwritten is set for the predetermined program stored in the second storage section, the write section overwrites the predetermined program with the program stored in the first storage section.

7. The information processing system according to claim 6, wherein the information processing apparatus further comprises:
   a comparison section that compares, before the predetermined program stored in the second storage section is overwritten, the predetermined program stored in the first storage section and predetermined program stored in the second storage section; and
   an information generation section that generates comparison result information indicating a result of the comparison performed by the comparison section,
   wherein the write section writes the comparison result information generated by the information generation section in the second storage section.

8. The information processing system according to claim 6, wherein the first storage section stores program recognition information for allowing the external computer to recognize the predetermined program, and the write section reads out the predetermined program and program recognition information stored in the first storage section when the information processing apparatus is communicably connected to the external apparatus by the communication connection section and writes the read out program and information in the second storage section.

* * * * *